US006288732B1

(12) United States Patent
Moriwaki

(10) Patent No.: US 6,288,732 B1
(45) Date of Patent: Sep. 11, 2001

(54) INFORMATION PROCESSOR

(75) Inventor: Kagumi Moriwaki, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/431,832

(22) Filed: Nov. 2, 1999

Related U.S. Application Data

(62) Division of application No. 08/927,055, filed on Sep. 10, 1997.

(30) Foreign Application Priority Data

Sep. 10, 1996 (JP) .......... 8-239084
Sep. 13, 1996 (JP) .......... 8-242933
Sep. 13, 1996 (JP) .......... 8-243363

(51) Int. Cl.[7] .......... G06K 15/00
(52) U.S. Cl. .......... 345/769; 345/804
(58) Field of Search .......... 345/334, 336, 345/340–349, 352–354, 356–357, 333, 335, 337–338, 339, 112, 116, 133, 121

(56) References Cited

U.S. PATENT DOCUMENTS 6,020,889 * 2/2000 Tarbox et al. .......... 345/356
6,057,845 * 5/2000 Dupouy .......... 345/358
6,069,625 * 5/2000 Nielsen .......... 345/334
6,081,263 * 6/2000 Leball et al. .......... 345/327
6,088,028 * 7/2000 Gipalo .......... 345/333
6,101,498 * 8/2000 Scaer et al. .......... 707/10
6,104,391 * 8/2000 Johnston, Jr. et al. .......... 345/334

FOREIGN PATENT DOCUMENTS 5-257979 10/1933 (JP) .
62-154062 7/1987 (JP) .
63-133272 6/1988 (JP) .
01-291367 11/1989 (JP) .
02-230371 9/1990 (JP) .
03-171368 7/1991 (JP) .
03-244078 10/1991 (JP) .
04-131944 5/1992 (JP) .
04-264975 9/1992 (JP) .
4-264975 9/1992 (JP) .
05-143647 6/1993 (JP) .
06-124313 5/1994 (JP) .
07-262222 10/1995 (JP) .
07-296145 11/1995 (JP) .
08-016608 1/1996 (JP) .

OTHER PUBLICATIONS

Petzold, *Programming Windows ®95, The Definitive Developer's Guide to the Windows 95 API*, Microsoft Press, 1996.*

* cited by examiner

*Primary Examiner*—Steven Sax
(74) *Attorney, Agent, or Firm*—Sidley & Austin

(57) ABSTRACT

In an information processor which stores and manages objects with attribute information added to the objects, an object is selected and attribute information of the object is stored in a storage medium. Then, in response to a command issued for copying the selected attribute information, the attribute information stored in the storage medium is added to another object. Thus, the same attribute information can be added to a different object easily. When the same attribute information is added to a plurality of objects, the attribute information selected are added to each of the objects at the same time and stored in a relation to each of the objects in the storage medium. Thus, the load for adding attribute information by a user is reduced largely. Beside a main dictionary which registers attribute information, a sub-dictionary registers data for identifying attribute information for a part of the attribute information registered in the main dictionary. Then, an attribute information can be selected easily in a dictionary even if the number of attribute information therein is large.

11 Claims, 32 Drawing Sheets

| | | | |
|---|---|---|---|
| Image data H1 | Keyword $h_{1-1}$ | Keyword $h_{1-2}$ | -------- |
| Image data H2 | Keyword $h_{2-1}$ | Keyword $h_{2-2}$ | -------- |
| Image data H3 | Keyword $g_{6-1}$ | Keyword $g_{6-2}$ | -------- |
| ⋮ | ⋮ | ⋮ | ⋮ |

Drag start

Drag

Drop

| 260 | 261 |
|---|---|
| Image data G1 | Brilliant , Stable , Gentle |
| Image data G2 | Light , Brilliant , Stable |
| Image data G3 | Brilliant , Stable |
| ⋮ | ⋮ |

Fig.27

| Index number | Keyword |
|---|---|
| 0001 | Bright |
| 0002 | Warm |
| 0003 | Active |
| 0004 | Generous |
| 0005 | Light |
| 0006 | Gorgeous |
| 0007 | Chic |
| 0008 | Quiet |
| 0009 | Sharp |
| 0010 | Fresh |
| 0011 | Smart |
| 0012 | Merry |
| 0013 | Massive |
| 0014 | Refreshing |
| 0015 | Cheerful |
| 0016 | Modern |
| 0017 | Wild |
| 0018 | Blue |

Fig.28

| Name of subdictionary | Index number of keyword |
|---|---|
| Keyword used often by YAMADA | 0001<br>0002<br>0005<br>0010<br>0013 |
| Keyword used often by YAMAMOTO | 0001<br>0002<br>0008<br>0011<br>0017<br>0018 |
| Sea | 0018<br>0014 |
| Mountain | 0010<br>0014 |

Fig.35A
| Index number | Keyword |
|---|---|
| 0001 | Bright |
| 0002 | Warm |
| 0003 | Active |
| 0004 | Generous |
| 0005 | Light |
| 0006 | Gorgeous |
| 0007 | Chic |
| 0008 | Quiet |
| 0009 | Sharp |
| 0010 | Fresh |
| 0011 | Smart |
| 0012 | Merry |
| 0013 | Massive |
| 0014 | Refreshing |
| 0015 | Cheerful |
| 0016 | Modern |
| 0017 | Wild |
| 0018 | Blue |
Fig.35B
| Index number | Icon |
|---|---|
| 0001 | 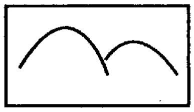 |
| 0002 | 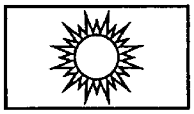 |
| 0003 | 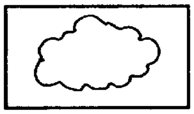 |
| ⋮ | ⋮ |
Fig.36
| Different subclass | Dictionary No. | Index number of retrieve key |
|---|---|---|
| Retrieve keys used often by YAMADA | 1 | 0001 |
| | 2 | 0002 |
| | 1 | 0005 |
| | 1 | 0010 |
| | 1 | 0013 |
| Retrieve keys used often by YAMAMOTO | 2 | 0001 |
| | 2 | 0002 |
| | 1 | 0008 |
| | 1 | 0011 |
| | 1 | 0017 |
| | 1 | 0018 |
| Sea | 1 | 0018 |
| | 2 | 0014 |
| Mountain | 1 | 0010 |
| | 2 | 0014 |

*Fig.37*

| 465 | 466 | 467 |
|---|---|---|
| Image data G1 | 0002<br>0010<br>0022 | 0011<br>0015 |
| Image data G2 | 0001<br>0005 | 0002<br>0003 |
| ⋮ | ⋮ | ⋮ |

INFORMATION PROCESSOR

RELATED APPLICATIONS

This application is a division of copending application Ser. No. 08/927,055 filed Sep. 10, 1997 pending, claiming priority from Japanese Patent Application No. 8-239084, filed Sep. 10, 1996, Japanese Patent Application No. 8-242933, filed Sep. 13, 1996, and Japanese Patent Application No. 8-243363, filed Sep. 13, 1996.

BACKGROUND OF THE INVENTION

1. Field of the Invention

The present invention relates to an information processor which stores and manages objects with attribute information added to the objects.

2. Description of Prior Art

Recently, computers are becoming popular rapidly, and the amount of electronic information dealt by people is increasing fast. In order to manage and use the electronic information efficiently, attribute data are added to individual electronic information in a database system. For example, retrieve keys such as keywords are added as attribute information to individual data which should be managed, and a data is retrieved with use of the retrieve keys.

So far, such attribute information is added to electronic information manually by users. Therefore, it is a very big burden for users to add attribute information to each of a large amount of electronic information. Moreover, when the same attribute information which has already been added to a certain electronic information is added as attribute information to other electronic information, the user has to repeat the same procedure or has to do a complex operation, for example, by reading the existing attribute information, copying the same and setting it as attribute information to other electronic information.

On the other hand, in a type of database management system, in order to improve the easiness of operation, retrieve keys are registered in a retrieve key dictionary, and desired retrieve keys are selected from the retrieve key dictionary when retrieve keys are added to a data or when retrieve keys are used for data retrieve. Retrieve keys registered in the retrieve key dictionary are displayed for example as a list in a screen, and desired keys are selected therein.

However, when the number of retrieve keys registered in the retrieve key dictionary increases, it becomes difficult for a user to look for a desired retrieve key. On the other hand, there is a tendency that a particular user uses a limited type of retrieve keys or does not use the other retrieve keys so often.

SUMMARY OF THE INVENTION

An object of this invention is to provide an information processor which reduces a burden of a user to add attribute information to a large amount of electronic information.

Another object of this invention is to provide an information processor which adds existing attribute information to an electronic information in a simple operation.

A further object of this invention is to provide an information processor which adds the same attribute information to a large amount of electronic information in a simple operation.

A still further object of this invention is to provide an information processor which selects desired attribute information easily when the number of attribute information registered in a dictionary is large.

In one aspect of the invention on an information processor which stores and manages objects with attribute information added thereto, when an attribute information on an object is copied for another object, a selection means selects an object, and a command issue means issues a command to copy attribute information of the object. Then, a copy means extracts the attribute information of the object and stores it in a storage medium in response to the issuance of the command to copy. An object represents an electronic information which is a subject to be stored and managed by the information processor such as a text data, an image data or a folder which contains a text data, an image data or the like. Further, attribute information represents a secondary information, added to an object as a subject to be managed, such as a retrieve key (keyword, color, form and the like), and creator, date of creation, size, comment or icon of the object. Preferably, another command is issued further to add the attribute information stored in the storage medium to the another object, and an addition means adds the attribute information stored in the storage medium to the another object in response to the issuance of the command to add. Thus, the same attribute information can be added to a different object easily.

In a second aspect of the invention on an information processor which stores and manages objects with attribute information added to the objects, a storage means is provided for storing an object and attribute information added to the object in a correspondence relation. When the same attribute information is added to a plurality of objects, a first selection means selects the objects, and a second selection means selects attribute information. Then, an addition means adds the selected attribute information to each of the objects at the same time and stores the attribute information in a relation to each of the objects in the storage medium. Thus, the load of a user for adding attribute information is reduced largely.

In a third aspect of the invention on an information processor which stores and manages objects with attribute information added to the objects, a main dictionary and a sub-dictionary are provided for retrieve. In the main dictionary attribute information and data for identifying the attribute information are registered, while in the sub-dictionary, data for identifying attribute information for a part of the attribute information registered in said main dictionary are registered. All the attribute information identified by the data registered in the sub-dictionary is displayed in a screen by the display device, and a selection means selects an attribute information displayed in the screen. In the sub-dictionary, not the attribute information, but data for identifying attribute information are registered. Then, a substance represented by the-attribute information is selected by the selection means with reference to the main dictionary and the sub-dictionary.

An advantage of this invention is that a burden of a user for adding attribute information to a large amount of objects is decreased.

Another advantage of this invention is that the same attribute information can be added to a plurality of objects in a simple operation.

A further advantage of this invention is that desired attribute information can be selected easily in a dictionary even when a large number of attribute information is registered in the dictionary.

BRIEF DESCRIPTION OF THE DRAWINGS

These and other objects and features of the present invention will become clear from the following description taken in conjunction with the preferred embodiments thereof with reference to the accompanying drawings, and in which:

FIG. 7 is a diagram of a data structure in a hard disk drive in which keywords are added as retrieve keys to each image data;

FIG. 27 is a diagram of an example of a keyword table of a main dictionary to which keywords are registered as retrieve keys;

FIG. 28 is a diagram of an example of a keyword table registered in each sub-dictionary;

FIG. 35A is a diagram of an example of a table of a first main dictionary to which keywords are registered as retrieve keys, and FIG. 35B is a diagram of an example of a table of a second main dictionary to which icons are registered as retrieve keys;

FIG. 36 is a diagram of an example of a table registered in each sub-dictionary; and FIG. 37 is a diagram of an outline of a data structure in the hard disk drive when the first and second main dictionaries are used.

DETAILED DESCRIPTION OF THE PREFERRED EMBODIMENTS

Figure 1:
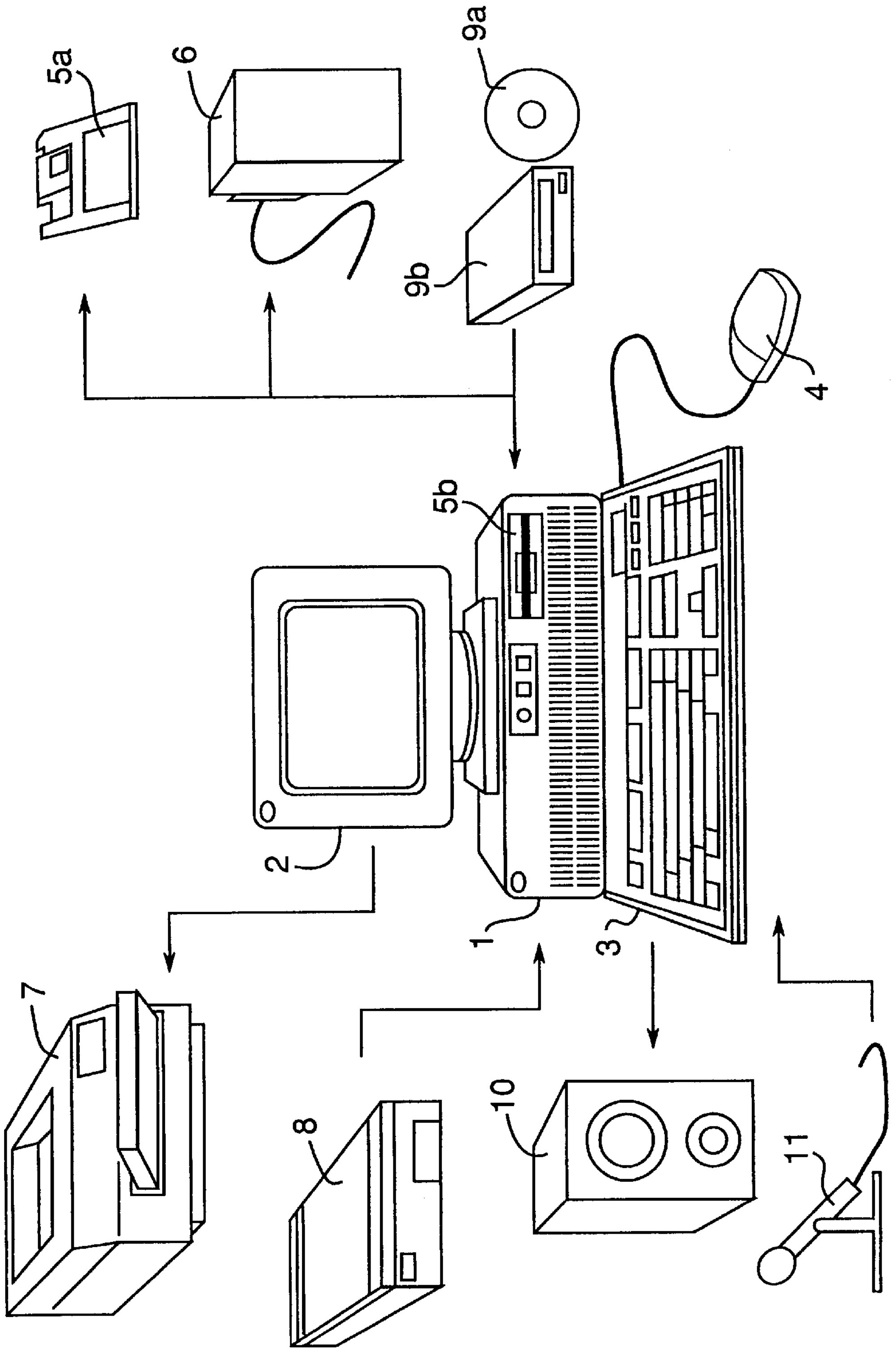
FIG. 1 is a schematic diagram of an information processor.

Referring now to the drawings, wherein like reference characters designate like or corresponding parts throughout the views, embodiments of this invention are explained.

First Embodiment

FIG. 1 shows an information processor (herein after referred to as system) of a first embodiment of the invention. The system has a database management system for image data using a graphical user interface. In this system, retrieve keys are added as attribute data to image data or objects, and an image data can be retrieved by using the retrieve keys.

Keywords, colors, forms and the like which represent characteristics of image are used as retrieve keys.

The system has a controller or a computer 1 having a central processing unit (CPU) for controlling the entire system. The information processor is connected through cables to various components 2–11. A display device 2 such as a cathode-ray tube (CRT) displays images and/or characters and various pictures for operation. A keyboard 3 and a mouse 4 are used to input various data and instructions. A flexible disk drive 5*b* writes and reads data to and from a flexible disk 5*a* as a medium for recording data. A hard disk drive 6 stores and manages input image data and retrieve keys therefor. A printer 7 prints an image or the like. A scanner 8 reads an image data from a sheet of document and sends it to the controller 1. A CD-ROM drive 9*b* reads data from a CD-ROM 9*a* as a medium for storing data. A speaker 10 gives an audio output, and a microphone 11 receives an audio input. Arrows in FIG. 1 shows directions of data flow in this system. These components may be combined with the controller 1 in an integrated unit.

Figure 2:
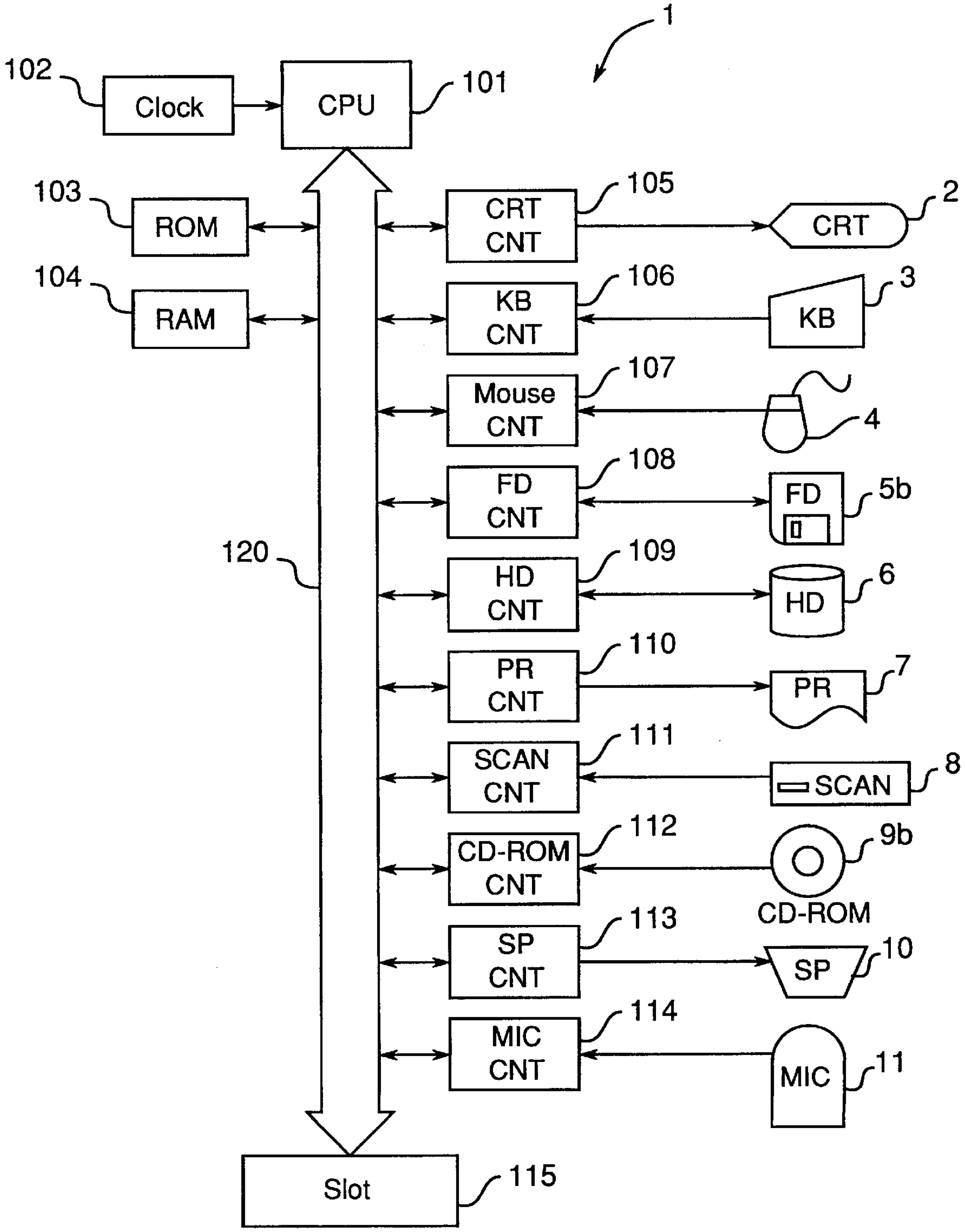
FIG. 2 is a block diagram of a controller which controls the information processor shown in FIG. 1.

FIG. 2 shows a block diagram of the information processor. The controller 1 has a central processing unit (CPU) 101 such as Intel i80486DX. The CPU 101 receives clock signals from a clock circuit 102. The CPU 101 is connected through a bus 120 to a read only memory (ROM) 103 for storing a program according to this embodiment for copying attribute data and the like, and a random access memory (RAM) 104 for storing various data. Further, the CPU 101 is connected to a CRT controller 105 which displays an image or characters in the display device 2, a keyboard controller 106 which transmits key-input signals from the keyboard 3, a mouse controller 107 which transmits input signals from the mouse 4, a flexible disk controller 108 which controls the flexible disk drive 6, a hard disk controller 109 which controls the hard disk drive 6, a printer controller 110 which controls the printer 7, a scanner controller 111 which controls the scanner 8, a CD-ROM controller 112 which controls the CD-ROM drive 9*b*, a speaker controller 113 which controls audio output signals to the speaker 10 and a microphone controller 114 which controls the microphone

11. Further, the CPU 101 is connected to extension slots 115. The flexible disk drive 5*b*, the hard disk drive 6, the scanner 8, the CD-ROM drive 9*b* and the like. may be connected through a SCSI board connected to the slot 115.

In the system explained above, the flexible disk 5*a* and the hard disk drive 6 are used as media for storing data. However, another type of media such as magneto-optic disk may also be used. Image data are input with the scanner 8 or the CD-ROM drive 9*b*. However, a still video camera, a digital camera or the like may also be used. The printer 7 is used as an output apparatus, but a digital copying machine or the like may also be used.

The program is stored in the ROM 302 in this system. However, in a different example, a part or all of the program for the system is stored in the flexible disk or the hard disk, and when the program is executed, it may be transmitted to the RAM 104.

In this system, image data are stored and managed in the hard disk drive 6. However, image data stored in the. CD-ROM 9*a* may also be managed directly. In this example, attribute information is added to index data which represent the image data stored in the CD-ROM 9*a* and they are stored in the hard disk drive 6. Attribute information is a secondary information, added to an object as a subject to be managed, such as a retrieve key (keyword, color, form and the like), and creator, date of creation, size, comment or icon of the object. A set of the index data and the attribute information is called as a record. When an image data is retrieved, a record is extracted first, and the image data are read from the CD-ROM 9*a* based on the index data in the record.

In this system, image data are objects to be dealt with. An object is an electronic information which is a subject to be stored and managed by the information processor. An object to be managed in this system may be still image data, moving picture data, character data, audio data or multimedia data as a combination thereof. In addition, a folder which contains these data together can also be dealt as an object, or when a network is constructed, each computer itself can be dealt as an object.

Next, the control of the CPU 101 in the controller 1 is explained. The CPU 101 is operated based on the program stored in the ROM 103. For example, it retrieves image data with use of retrieve keys, copies all the retrieve keys added to the image data to the RAM 104 by issuing a command to the image data, and adds retrieve keys in the RAM 104 to other image data. The retrieve processing is briefly explained first, and the copy processing of attribute information is explained next.

Figure 3:
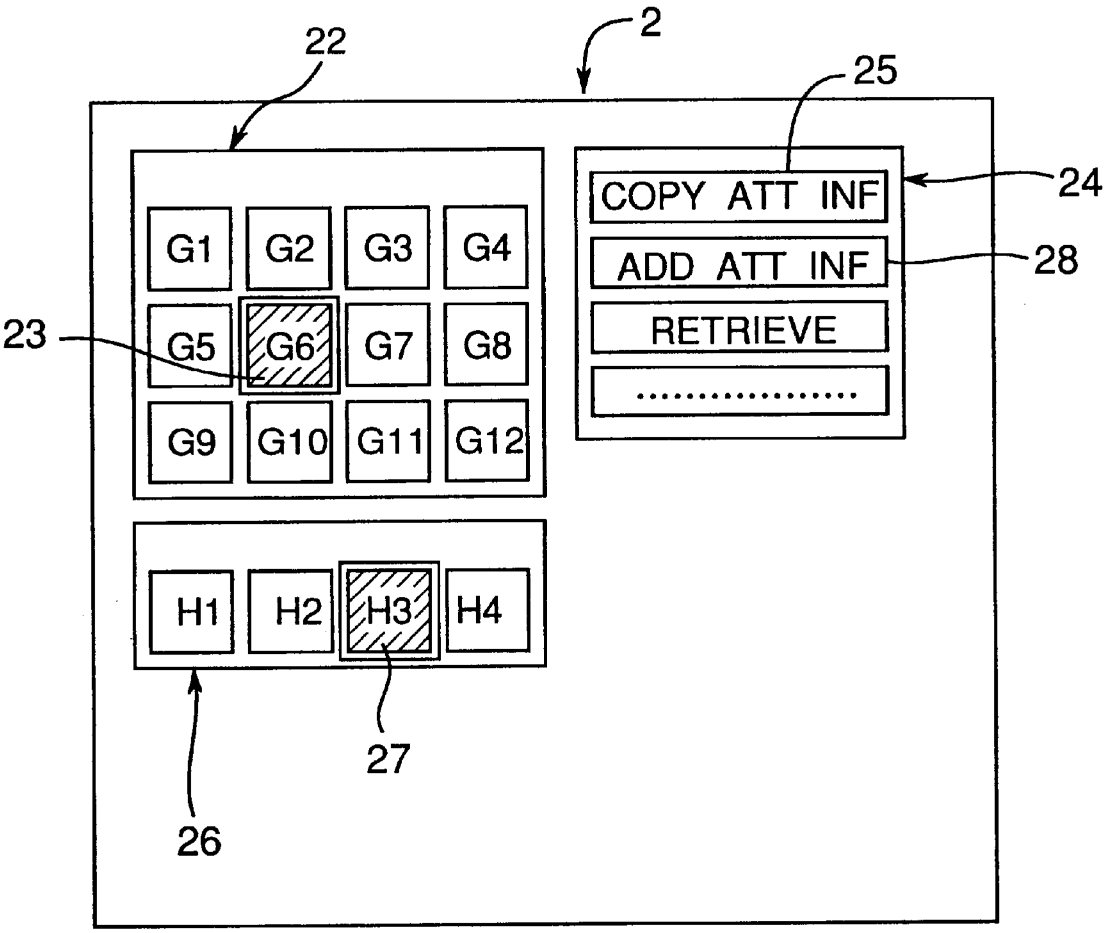
FIG. 3 is a diagram of an initial setting screen displayed in a display device in a first embodiment.

FIG. 3 shows an initial setting screen displayed in the display device 2. The initial setting screen has three windows 22, 24 and 26. The window 22 displays a list of icons (G1–G12 in this example) of all the image data to which retrieve keys have already been added as attribute information, while the window 26 displays a list of icons (H1–H4 in this example) of all the image data to which retrieve keys have not yet been added, among the image data stored in hard disk drive 6. Data such as keywords, colors and forms which represent characteristics of the image are added as retrieve keys to each image data in the list. In the window 24, a menu for selecting the type of processings to be executed is displayed. When a user selects one or more retrieve keys and instructs to start retrieve, image data having at least one of the retrieve keys as attribute data are retrieved in the image data stored in the hard disk drive 6, and only the retrieved data are shown as the list in the window 22.

Figure 4:
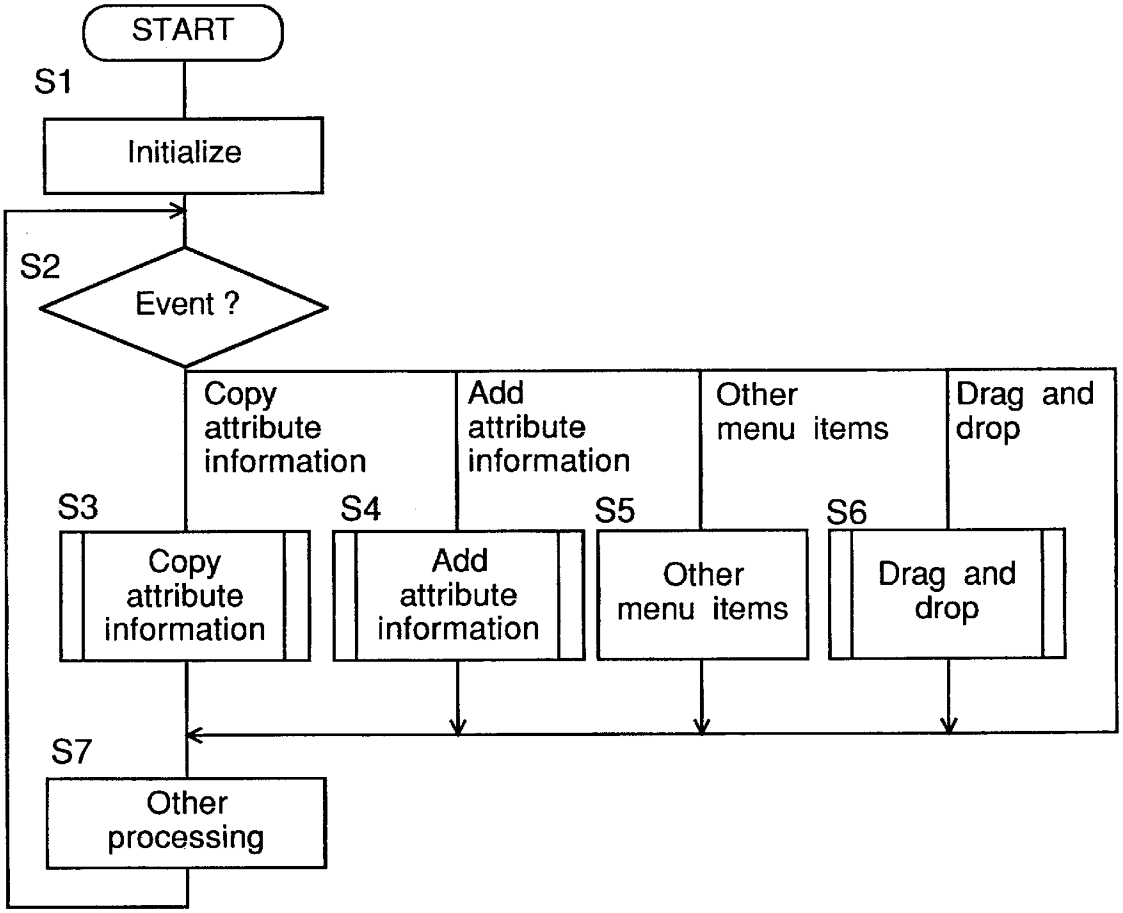
FIG. 4 is a flowchart of a main routine of the system of the first embodiment.

FIG. 4 is a flowchart of a main routine of the program executed by the CPU 101. When the electric power of the system is supplied, variables and the like used for the processing are initialized, and the initial setting screen is displayed in the display device 2 (step S1). Then, the flow branches when an event happens such as menu selection or drag-and-drop (step S2). In the initial setting screen shown in FIG. 3, a menu is displayed in the window 24. When "copy attribute information" 25 is selected in the window 24 or a command therefor is issued, the data of attribute information of the image data 23 selected in the window 22 are copied and stored in the RAM 104 temporarily (step S3). When "add attribute information" 28 is selected in the window 24 or a command therefor is issued, the data of attribute information stored in the RAM 104 are added to image data 27 selected in the window 26 (step S4). When another menu item in the window 24 is selected or a command therefor is issued, the processing therefor is performed (step S5). When drag-and-drop from an icon of the image data in the window 22 to an icon in the window 26 happens by operating the mouse 4, drag-and-drop processing is executed (step S6). Then, after these processing, other processing is performed (step S7), and the flow returns to step S2. The flow proceeds readily to step S7 when no event is decided to happen at step S2. The processings executed at steps S5 and S7 are not explained further because they are well known and not related directly to the database management system of this embodiment.

Figure 5:
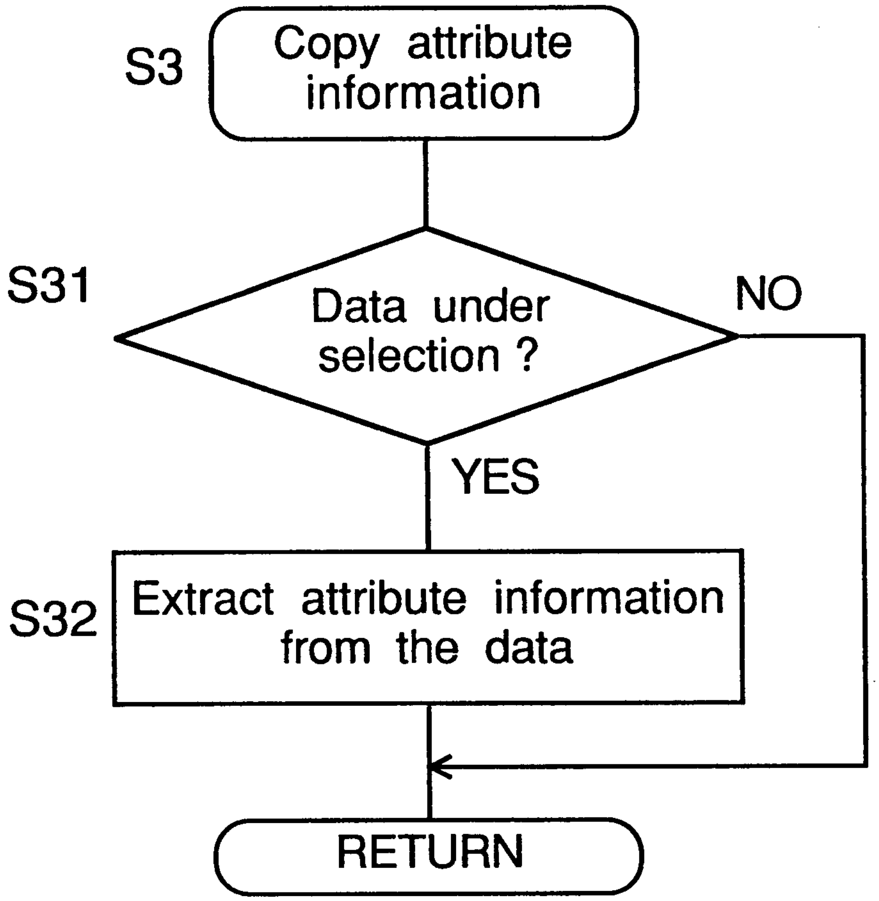
FIG. 5 is a flowchart of copy attribute information processing.

FIG. 5 is a flowchart of the copy attribute information processing (step S3 in FIG. 4). If it is decided that an icon (say G6) have been selected in the list shown in the window 22 with the keyboard 3 or the mouse 4 (YES at step S31), all the attribute information data added to the selected image data, or retrieve keys in this example, are extracted and stored in the RAM 104 (step S32). Then, the flow returns to the main routine. If no image data in the window 22 is selected (NO at step S31), the flow returns readily to the main routine.

Figure 6:
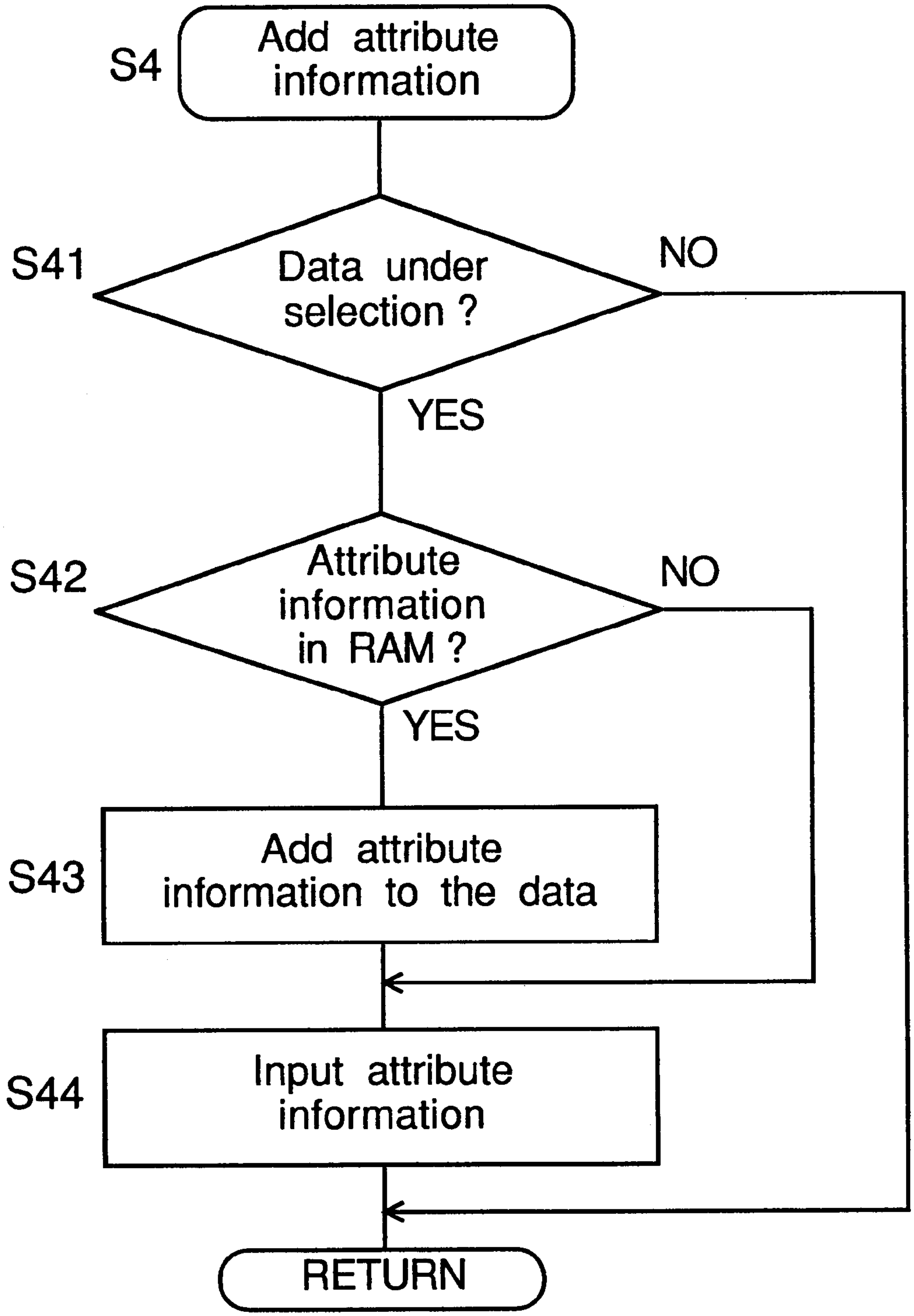
FIG. 6 is a flowchart of add attribute information processing.

FIG. 6 is a flowchart of the add attribute information processing (step S4 in FIG. 4). If it is decided that an image data (say H3) have been selected in the list shown in the window 26 with the keyboard 3 or the mouse 4 (YES at step S41), it is next decided if attribute information data, that is, retrieve keys in this example, are stored in the RAM 104 (step S42). If it is decided that attribute information data are stored in the RAM 104 (YES at step S42), the data of the attribute information stored in the RAM 104 are added to the selected image data (step S43). If no image data is selected (NO at step S41), the flow returns readily to the main routine. If it is decided that the attribute information data is not stored in the RAM 104 (NO at step S42), or after the data of the attribute information stored in the RAM 104 is added to the image data selected (step S43), attribute data may be input manually one by one for adding or deleting a retrieve key (step S44). Then, the flow returns to the main routine.

In a modified example, when an image data having already attribute information added thereto is selected as an object to which attribute information is copied, the attribute information stored in the RAM 104 may be added to the attribute information which has already been added, or the attribute information which has already been added may be updated with the attribute information stored in the RAM 104.

FIG. 7 shows an outline of a data structure in the hard disk drive 6. There are provided a storage area 60 for storing registered image data H1, H2, H3, . . . , and a storage area 61 for storing attribute information data of retrieve keys h1-1, h1-2, . . . added to each of the image data. For example, in the setting screen shown in FIG. 3, let us assume a case where the image data G6 is selected in the window 22, "copy attribute information" 25 is selected in the menu in the window 24, the image data H3 is selected in the window 26, and "add attribute information" 28 is selected in the window 24 successively. In this case, the attribute information such as keywords g6-1, g6-2, . . . for the image data G6 are stored temporarily in the RAM 104 and then written to the storage area 61 in correspondence to the image data H3 in the hard disk drive 6.

As explained above, the menu items 25 and 28 (FIG. 3) are selected with the keyboard 3 or the mouse 4. However, in a different way, the drag and drop operation is performed for the same purpose by drag and drop of an icon of the image data displayed in the screen.

Figure 8A:
FIGS. 8A, 8B and 8C are diagrams of situations in an example when attribute information is copied and added by drag and drop operation.
Figure 8B:
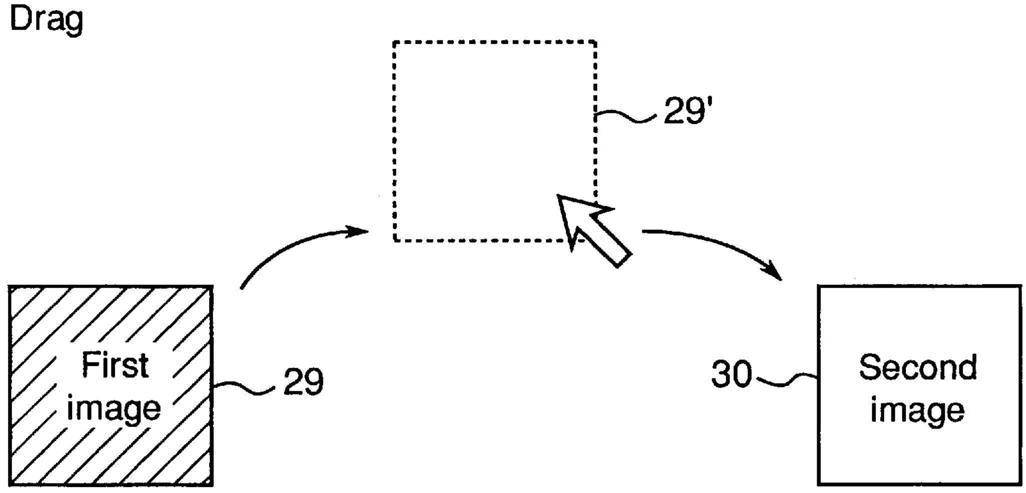
Figure 8C:

FIGS. 8A–8C are diagrams of an example where the copy of attribute information is executed by drag and drop from a first image to a second image. In FIG. 8A, the first image is selected in the screen by a user, as shown with hatching, by moving the mouse pointer to the icon 29 of the first image data and clicking the mouse button by operating the mouse 4. FIG. 8B shows that the icon 29' of the selected first image data is dragged to the second image (or the selected icon is moved by operating the mouse while pressing the mouse button). When the icon 29' of the first image data is overlapped on an icon 30 of the second image data, as shown in FIG. 8C, the second image data is selected, as shown with hatching. Then, by releasing the mouse button in this position, the icon of the first image is dropped on that of the second one.

Figure 9:
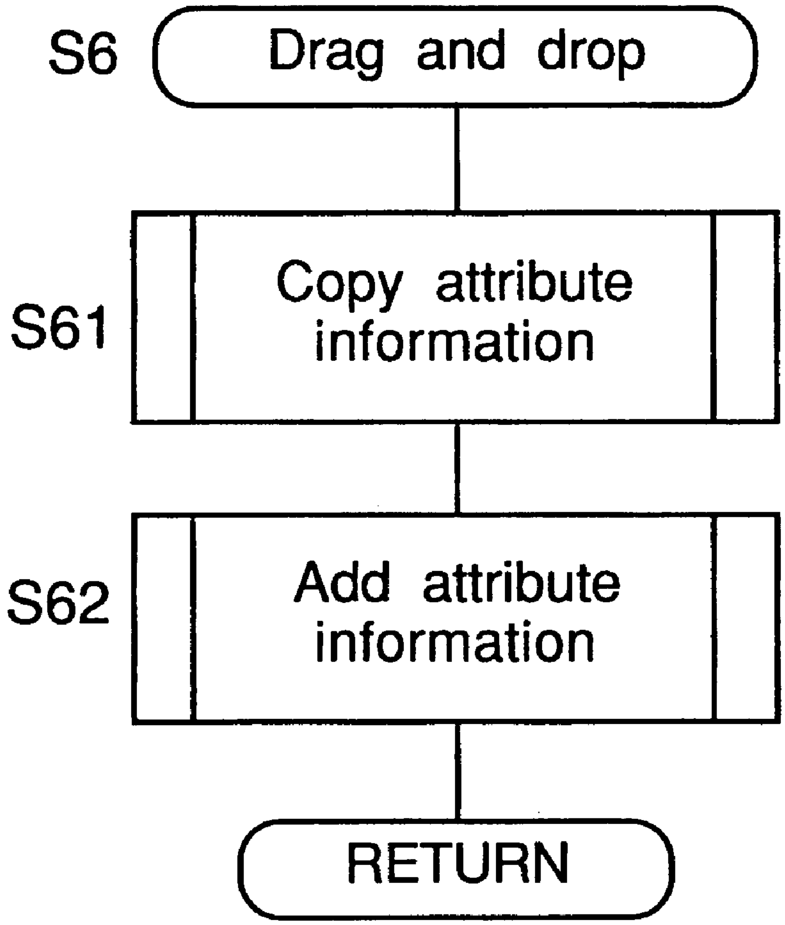
FIG. 9 is a flowchart of drag and drop processing.

In the processing of the main routine shown in FIG. 4, when an event of drag and drop happens (step S6 in FIG. 4) the CPU 101 executes drag and drop processing shown in FIG. 9. A drag and drop is detected at a timing when the icon is dropped. When a drag and drop is detected and the drag and drop processing routine is called, the copy attribute information processing is performed (step S61) which is the same as the processing of step S3 in FIG. 4 and the add attribute information processing is performed next (step S62) which is same as the processing of step S4 in FIG. 4. Duplicated explanation of steps S61 and S62 is omitted here. Thus, the copy attribute information command and the add attribute information command are issued at the same time, so that the attribute information of the first image data is written to the RAM 104 and the attribute information written to the RAM 104 is added to the second image data. In a different example, when the icon of the first image data is dropped on the icon of the second image data, it can be selected whether the attribute information is copied or not. Further, the drag and drop operation is not limited to an icon of image data. For example, it may be performed on a character or word representing an image data, an image data itself or a part thereof, a reduced image data, or the like.

In this embodiment, all of the attribute information on the selected image data are stored in the RAM 104 when the attribute information is copied. However, it is possible to select and store a part thereof.

In a modified embodiment, a document file with comments added as attribute information is dealt as an object, similarly to the image data explained above. In this case, an icon of a document file is selected, and it is dragged and dropped to an icon of another document file. Then, the comment of the same content is added to the another document file. As a result, a time can be saved to add the same comment repeatedly to other document files. The document file as a target for copying operation can be an image data file or a different kind of file.

Moreover, in a different modified embodiment, the system is a server in a server and client network. In this system, an icon of a client displayed in the display device 2 is selected as a target, and the icon of the client is drag-and-dropped to an icon of another client. Thus, a user ID for access, file types accessible by the user, and the like are copied as attribute information. As a result, when a new client is connected to the network, it is not needed for the new client to input many items, and the content about another client can be used for correcting only a part thereof based on the content. Thus, a time of the new user of the server can be reduced.

In the above-mentioned information processor, an object is selected and a command is issued to copy the attribute information Then, attribute information added to the selected object is copied to a storage medium. It is preferable to add the attribute information in the storage medium to other object selected to be added the attribute, information by issuing a command to add attribute information.

As mentioned above, when the same attribute information as that of an object is added to other objects, this can be achieved by a simple operation to select the object and to issue a command. This is especially advantageous in a database management system which controls a large amount of data (objects) when the same attribute information is added as a retrieve key to each of these data.

Second Embodiment

Next, an information processor of a second embodiment of the invention is explained. The information processor also has a database management system for image data using a graphical user interface, and it consists of the components shown in FIG. 1. A controller which controls the information processor has a structure similar to that as shown in FIG. 2. However, the ROM 103 stores a program for executing the database management system of the second embodiment including processing on attribute information explained below. In this system, keywords which represent characteristics of an object are used as retrieve keys, and they are added to objects or image data. The hard disk drive 6 stores and manages a dictionary storing all the keywords, input image data and attribute information thereof.

In this system, image data are objects to be dealt with. However, similarly to the first embodiment, an object to be managed in this system may be still image data, moving picture data, character data, audio data or multi-media data as a combination thereof. In addition, a folder which contains these data together can also be dealt as an object, or when a network is constructed, each computer itself can be dealt as an object.

Figures 10, 11:
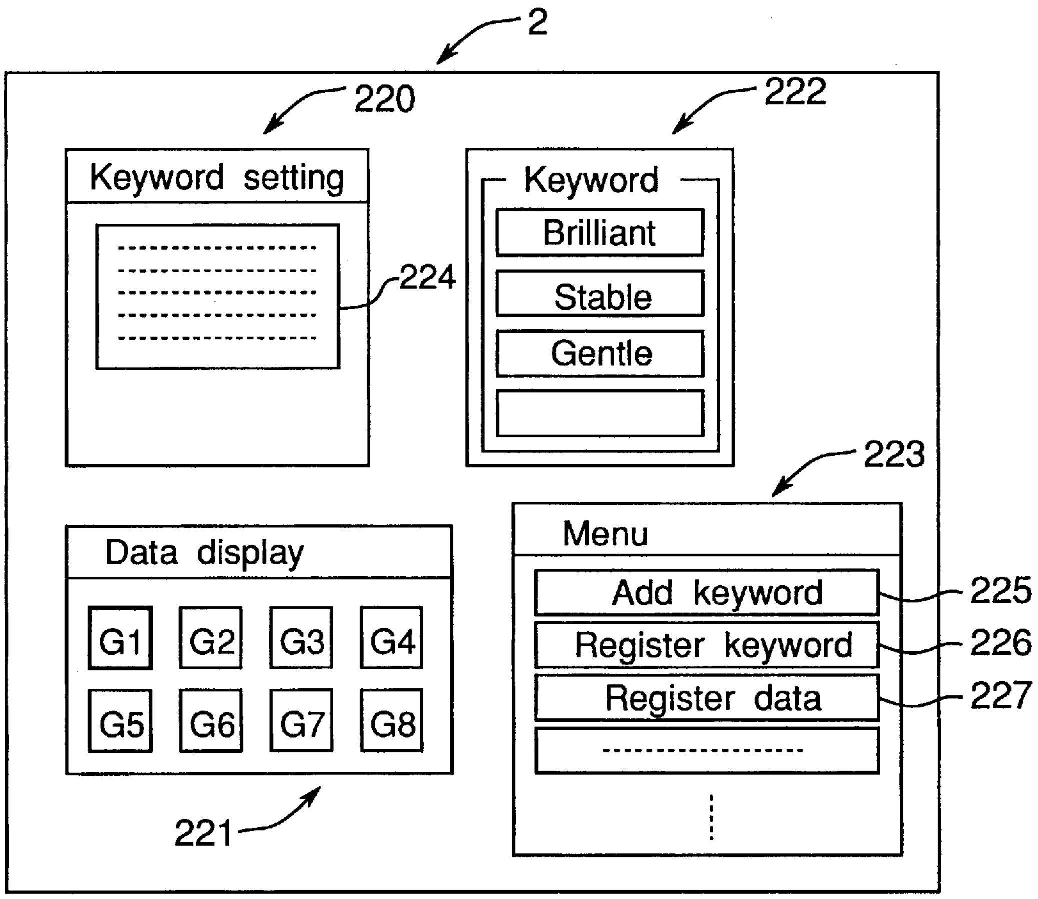
FIG. 10 is a diagram of an initial setting screen displayed in a display device in a second embodiment.
FIG. 11 is a diagram of a data structure in a hard disk drive.

FIG. 10 shows an initial setting screen displayed in the display device 2. Windows 220–223 are displayed in the display device 2. The window 220 shows a box 224 where the keyword registered in a keyword dictionary is listed. The window 221 shows a list of image data G1, G2, G3 and the like registered in the image database. The window 222 shows keywords added to the selected image data in four list boxes, as will be explained in detail later. The window 223 shows a menu for selection and command to be executed. The initial menu screen includes "add keyword" 225 for adding a keyword to the image data, "register keyword" 226 for registering a new keyword to a keyword dictionary and "register data" 227 for registering a new image data in the hard disk drive 6. The menu screen shows various menus beside the initial menu screen according as the processing to be executed is changed.

FIG. 11 shows an outline of a data structure in the hard disk drive 6. The data structure has an area 260 for storing image data G1, G2, G3 and the like registered in the image database and an area 261 for storing keywords added to each of the image data. When a keyword is appended to the image data, a data corresponding to the appended keyword is written to the area 261 corresponding to the image data. This system can add four keywords at the maximum to one image data, as shown in the window 222.

Figure 12:
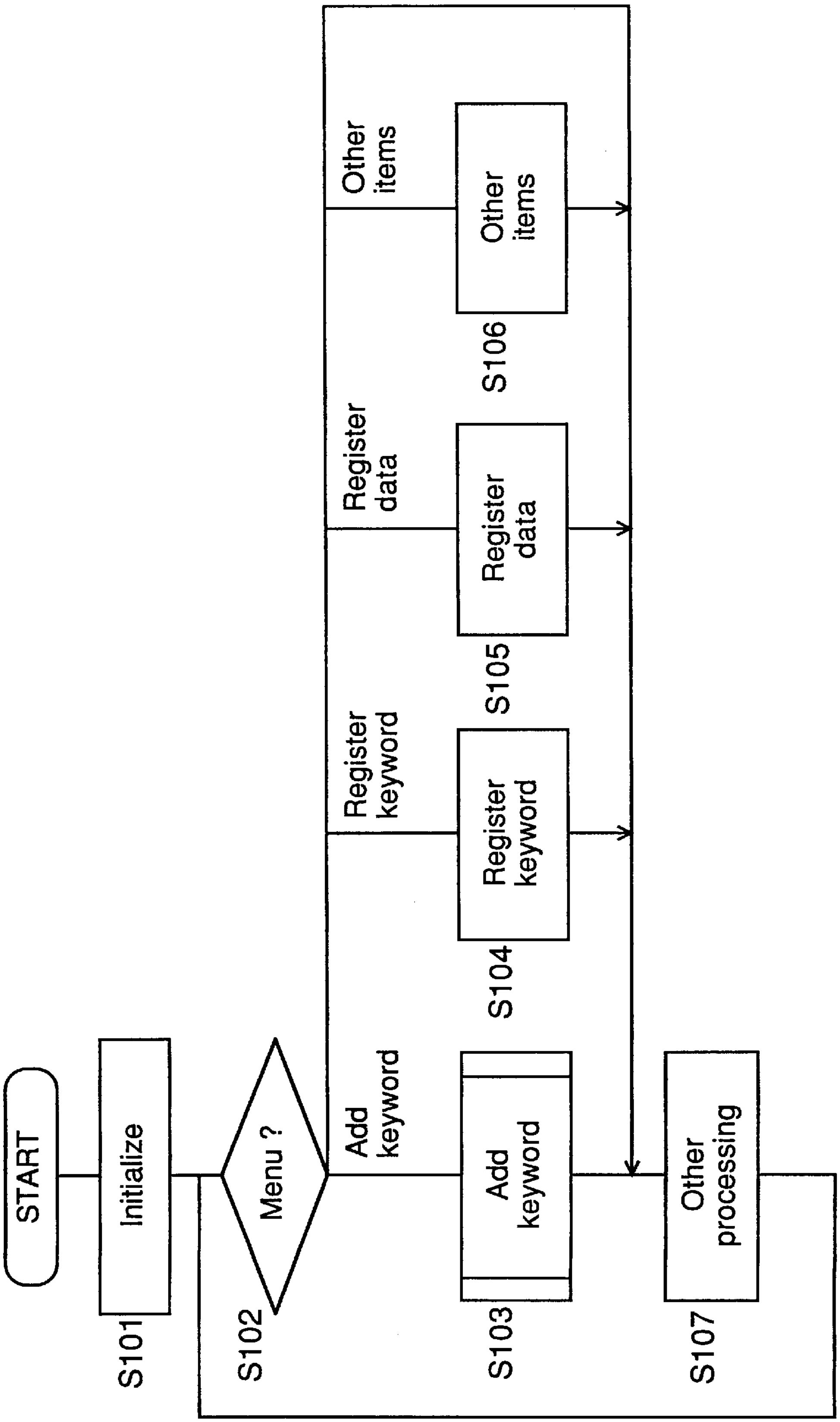
FIG. 12 is a flowchart of a main routine.

Next, the control of the CPU 101 in the controller 1 is explained. FIG. 12 is a flowchart of a-main routine of the control processing executed by the CPU 101. First, when the power supply of the system is supplied and the program is activated, the initialization is performed such as display of the initial screen (refer to FIG. 10) in the display device 2 and initialization of variables for each processing (step S101). Next, it is decided whether the menu is selected or not (step S102). When "add keyword" 225 is selected in the menu, the add keyword processing for adding a keyword to an image data is executed (step S103). When "resister keyword" 26 is selected in the menu, a new keyword is registered in the keyword dictionary (step S104). When "register data" 27 is selected in the menu, a new image data is registered in the hard disk drive 6 (step S105). When another menu item is selected in the menu, processing for the selected menu item such as data retrieve with use of the keywords is executed. (step S106). Then, the flow proceeds to step S107. When any menu is not selected, the flow proceeds readily to step S107 for other processing. The keyword registration (step S104), the data registration (step S105), the other menu processing (step S106), and the other processing (step S107) are not explained further because they are basically similar to the counterparts in a prior art information processor and are not related directly to the present invention.

Figure 13:
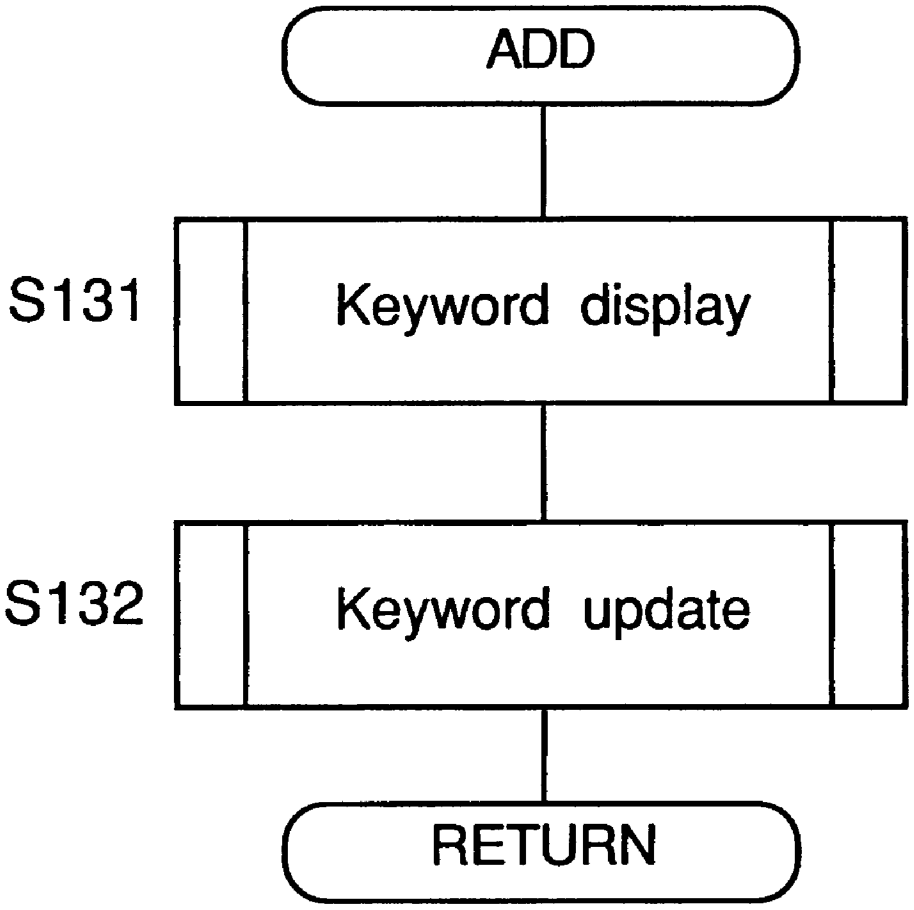
FIG. 13 is a flowchart of add keyword.

FIG. 13 is a flowchart of the add keyword (step S103 in FIG. 12). First, keywords added already to the selected image data are displayed (step S131, refer to FIG. 14), and a keyword or keywords are added or changed for the selected image data (step S132, refer to FIG. 17). The processings at steps S131 and S132 are explained in detail below.

Figure 14:
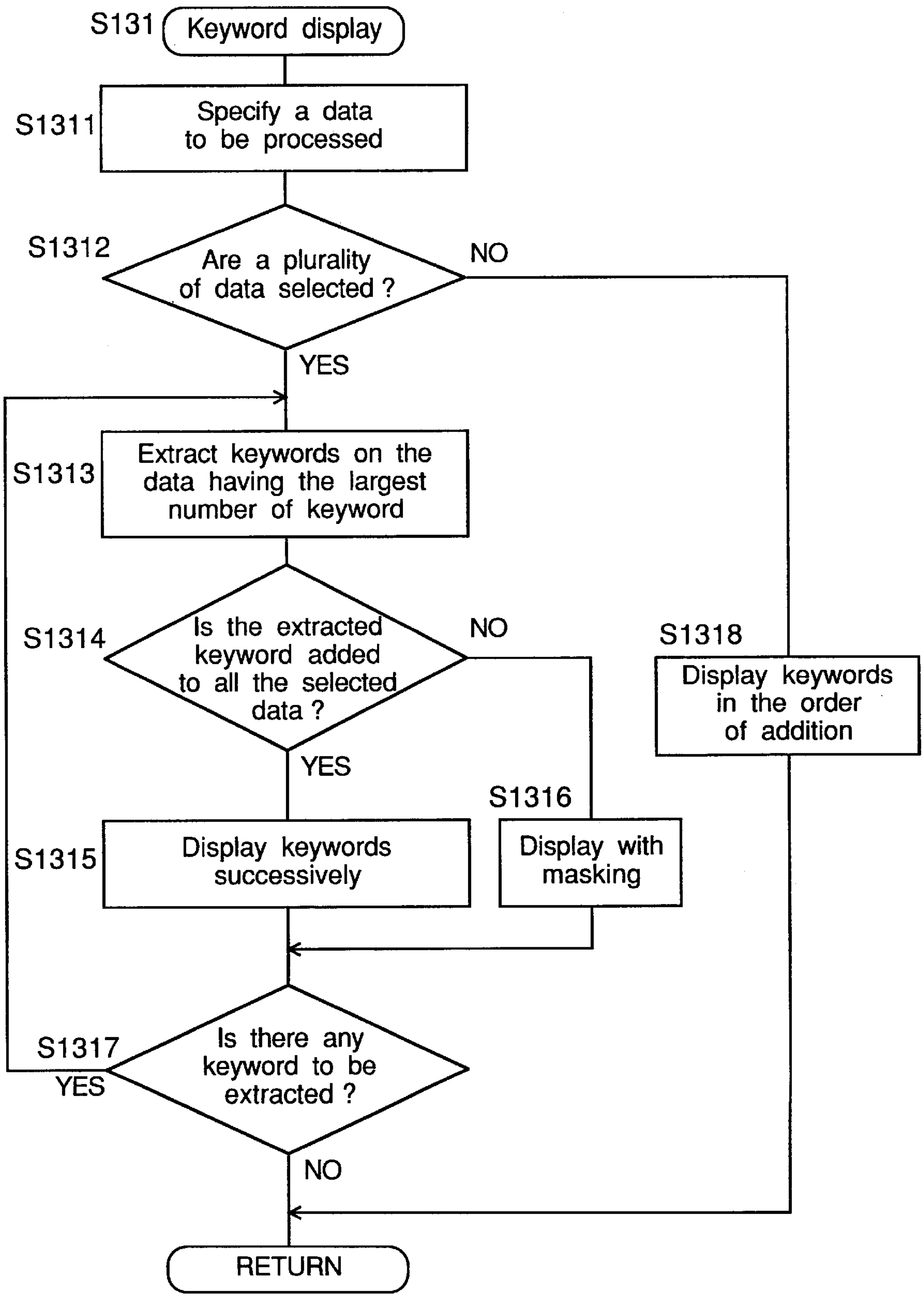
FIG. 14 is a flowchart of display keyword.

FIG. 14 is a flowchart of the keyword display (step S131 in FIG. 13). First, an image data to which a keyword is desired to be added is selected in the image data shown in the is window 221 (step S1311). If it is decided that a plurality of image data are selected (YES at step S1312), a keyword is extracted in the keywords on the image data having the largest number of keywords (step S1313). If the extracted keyword has already been added to all the selected image data (YES at step S1314), the keywords are displayed in the order of the keyword list from upside to downside in the window 222 (step S1315). On the other hand, if at least one of the selected image data does not have the extracted keyword (NO at step S1314), the keyword is displayed in an empty space in the window 222 with masking. The masking is performed to discriminate the. keywords common to all the selected image data from the others. A different display technique such as reverse display or shaded display may be adopted instead of masking. If the above-mentioned steps S1313–S1316 have not yet been completed for all the keywords (YES at step S1317), the flow returns to step S1313. Thus, the steps S1313–S1317 are repeated for all the keywords on the image data having the largest number of keywords. Thus, the all keywords are shown in the keyword list. If it is decided that a plurality of image data are not selected, i.e., one image data is selected (NO at step S1312), the keywords added to the selected image data are shown in the window 222 from upside to downside in the order of addition.

Figure 15:
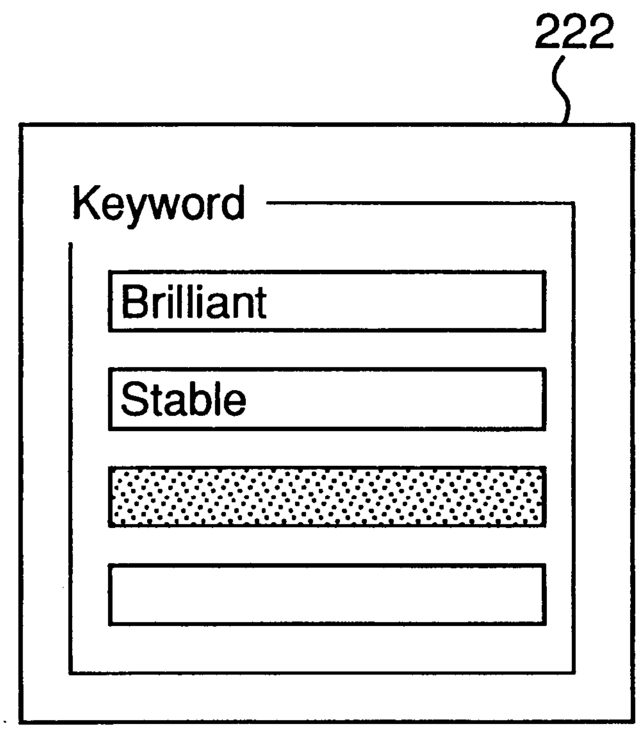
FIG. 15 is a diagram of a keyword list displayed when two or more image data are selected.

FIG. 15 shows an example of the keyword list when a plurality of image data are selected. It is assumed that three keywords of "brilliant", "stable" and "gentle" have already been added to an image data having the largest number of keywords among the selected image data. Among the three keywords, the two, "brilliant" and "stable", are common to all the selected image data. Then, they are shown in the window 222 in the order of the list of the keyword sequentially. On the other hand, the keyword "gentle" is not added to at least one of the other selected image data, so that it is shown at the last with masking in the window 222. That is, the keywords common to all of the selected image data are shown in a normal state, while the others are shown with masking.

Because the number of keywords which can be added to one image data is equal to or smaller than four in this system, it is understood from the keyword list shown in FIG. 15 that one keyword can be appended to the plurality of the selected image data surely as a common keyword. Moreover, it is also understood that the number of keywords which can be added as common keywords can be known from the number of the keywords under masking. Keywords under masking can be appended as common keywords when all the other image data has two or less keywords or when a part of the other image data has three keywords which are common to the listed three keywords.

Figure 16:
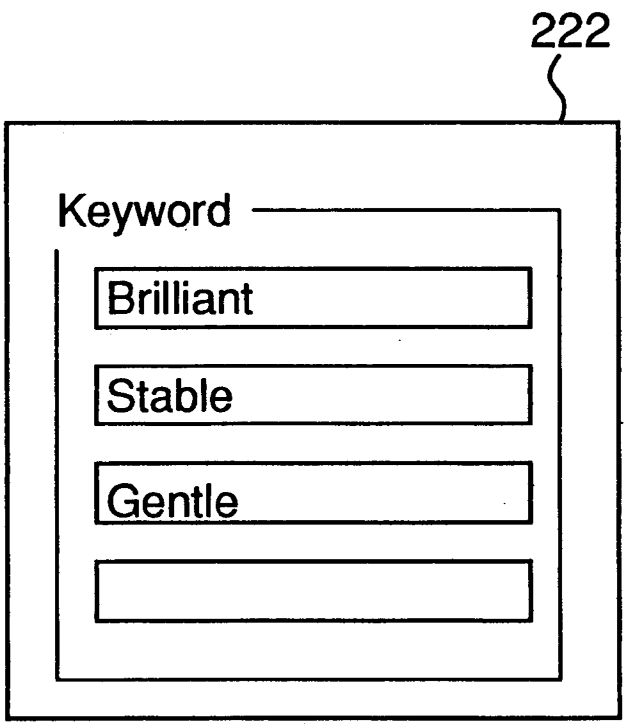
FIG. 16 is a diagram of a keyword list displayed when one image data is selected.

FIG. 16 shows an example of keyword list which is generated after one image data is selected in the above-mentioned keyword display processing. Three keywords of "brilliant", "stable" and "gentle" are added to the selected image data, and the keywords are displayed in the order of the addition of the keywords.

Figure 17:
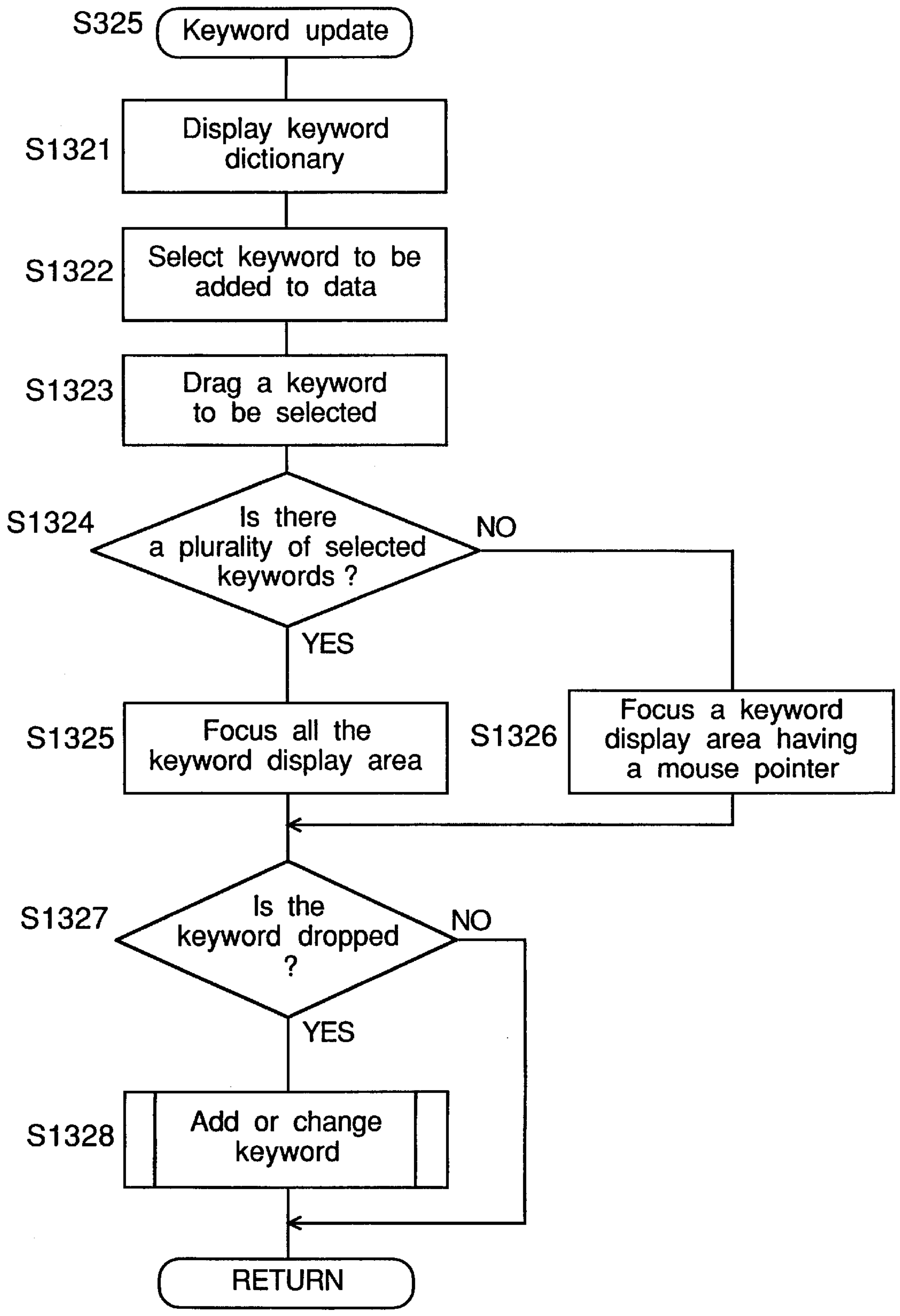
FIG. 17 is a flowchart of keyword update.
Figure 18:
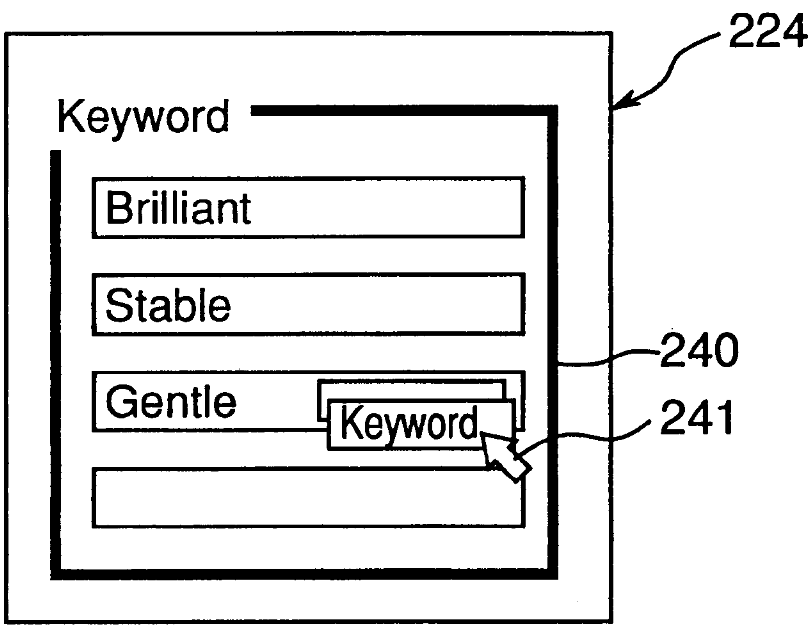
FIG. 18 is a diagram when two or more keywords are drag-and-dropped.

FIG. 17 is a flowchart of the keyword update (step S132 in FIG. 13) wherein a new keyword is added to the image data selected in the above-mentioned keyword display processing (step S131 in FIG. 13). First, keywords registered in a keyword dictionary are shown as a list in the window 220 (refer to FIG. 10) (step S1321). Then, a keyword to be added to the image data is selected by a user by operating a mouse pointer with the mouse 4 (step S1322). A plurality of keywords can be selected at the same time by clicking the plurality of keywords while pressing a specified key in the keyboard 3. Then, the selected keyword or keywords are dragged to the window 222 where the keywords which have already been added to the selected image data are listed (step S1323). Then, if the number of the selected keywords is over one (YES at step S1324), the whole area of the keyword list is enabled for setting, and a contour line 240 enclosing the area is high-lighted (step S1325), as shown in an example in FIG. 18. If a plurality of keywords are dragged, a mouse pointer 241 is displayed in a state with stacked icons. It is possible to display the number of selected keywords besides the mouse pointer 241.

Figure 19:
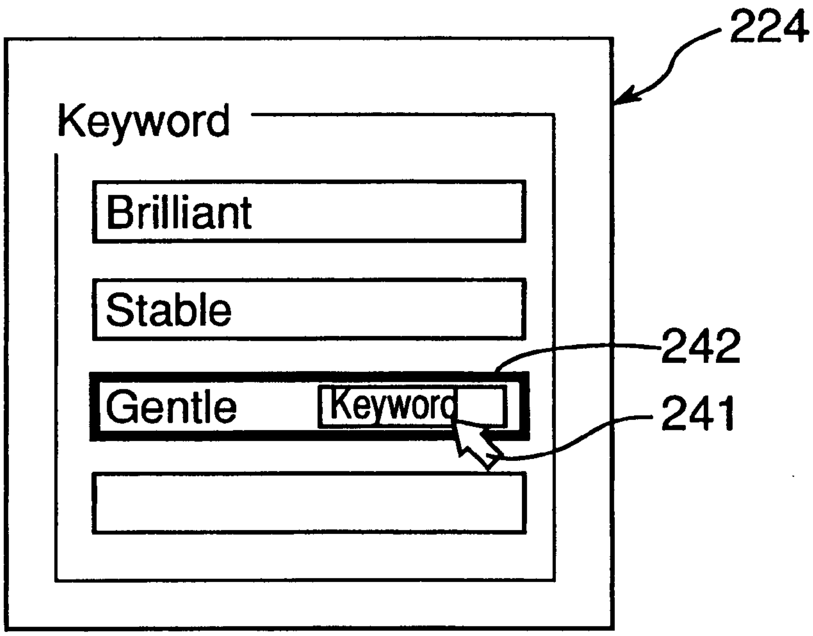
FIG. 19 is a diagram when a keyword is drag-and-dropped.

On the other hand, if the number of the selected keywords is one (NO at step S1324), only the list box 242 which represents a keyword pointed by the mouse pointer 241 is enabled for setting and high-lighted (step S1326), as shown in an example in FIG. 19. When one keyword is dragged, as shown in FIG. 19, a mouse pointer 241 is displayed with one icon.

Figure 20:
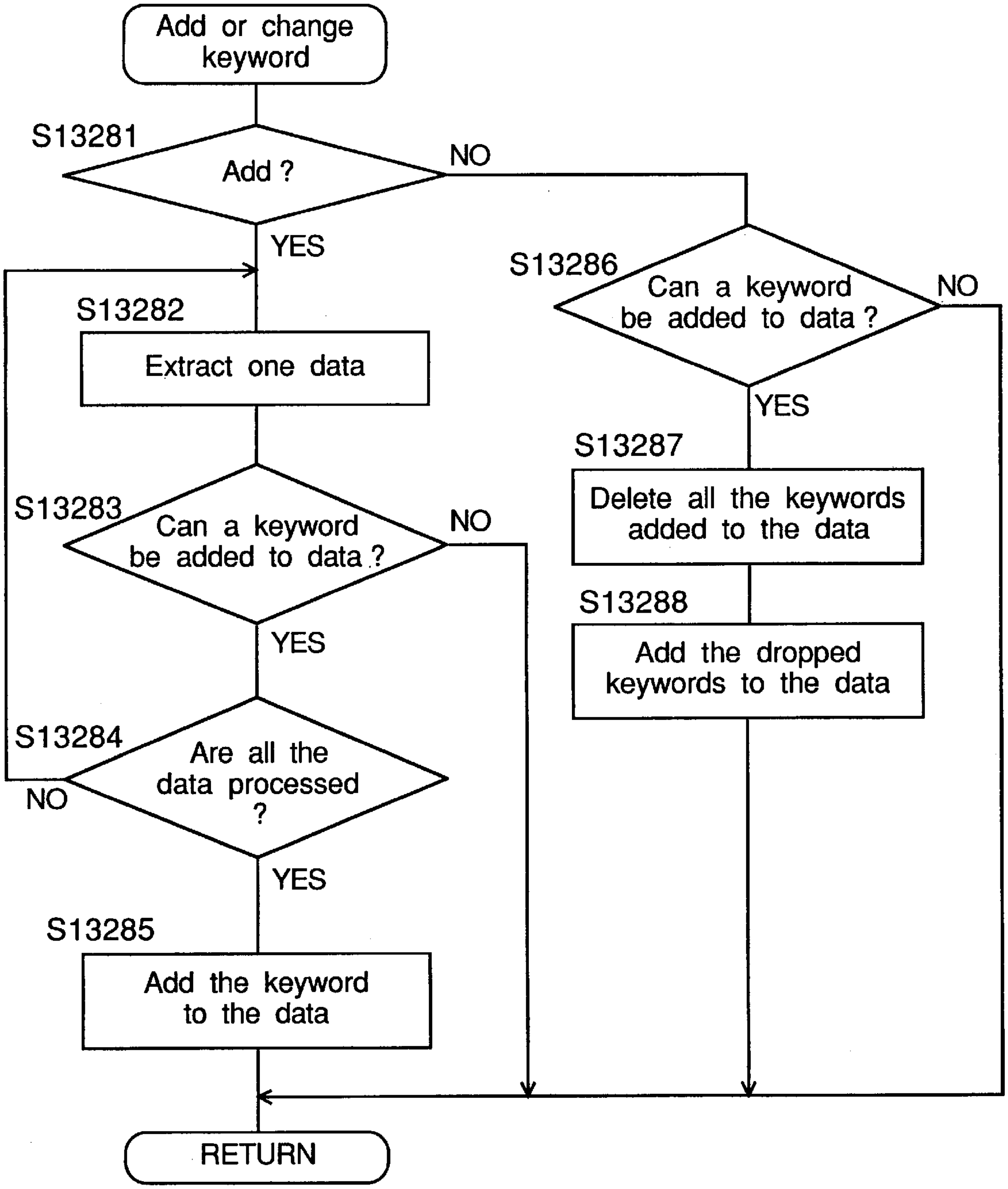
FIG. 20 is a flowchart of add/change keyword.

When the keyword which has to be added is dropped in the high-lighted area (YES at step S1327), the keyword is added or changed (step S1328, refer to FIG. 20).

In the above-mentioned steps S1325 and S1326, any keyword can be accepted without considering whether it can be added to the image data or not. However, it is possible to reject a keyword when the keyword cannot be added to the image data. The criterion whether the selected keyword can be added or not is explained later with reference to steps S13283 and S13286 (FIG. 20) for adding or changing keywords.

FIG. 20 is a flowchart of adding or changing keywords (step S1328 in FIG. 17). First, it is decided whether a keyword is added or not (step S13281). If a keyword is not added (NO at step S13281), this means complete replacement of keyword. This selection may be performed in the menu screen in the window 223, with a click of a button or the like.

If it is decided that add is selected (YES at step S13281), an image data is extracted in the image data selected in FIG. 14 (step S13282). Next, it is decided whether the selected keyword at step S1322 (FIG. 17) can be added to the extracted image data or not (step S13283). It is decided here that the selected keyword can be added if the number of the selected keywords is equal to or less than the difference between the largest number of keywords to be added to an image data (four in this example) and, the number of the keyword which have already been added to the image data. In this decision, if the selected keywords includes a keyword which have already been added to the image data, the keyword is neglected in the calculation. If it is decided that the keyword cannot be added (NO at step S13283), the flow returns readily to the flow of FIG. 17. On the other hand, if it is decided that the keyword can be added (YES at step S13283), the flow proceeds to step S13284 in order to confirm whether the decision of all the image data is completed or not. If the decision is completed on all the image data (YES at step S13284), or if the selected keywords can be appended to all the image data, the selected keywords are added to each image data at the same time (step S13285). That is, the data of the selected keywords are stored in the area 61 (FIG. 7) for each image data in the hard disk drive 6.

On the other hand, if it is decided that a keyword is not added (NO at step S13281) or if change of keyword is selected, all the keywords are completely replaced. Then, it is decided whether the keywords selected at step S1322 can be added to the image data or not (step S13286). It is decided here that the selected keywords can be added if the number of the selected keywords is equal to or less than the largest number of keywords to be added to an image data (four in this example). If it is decided that the selected keywords cannot be added (NO at step S13286), the flow returns readily to the flow of FIG. 17. On the other hand, if it is decided that the selected keywords can be added (YES at step S13286), all the keywords which have already been added to the selected image data are deleted (step S13287), and the selected keywords are added to each image data at the same time (step S13288).

Figure 21:
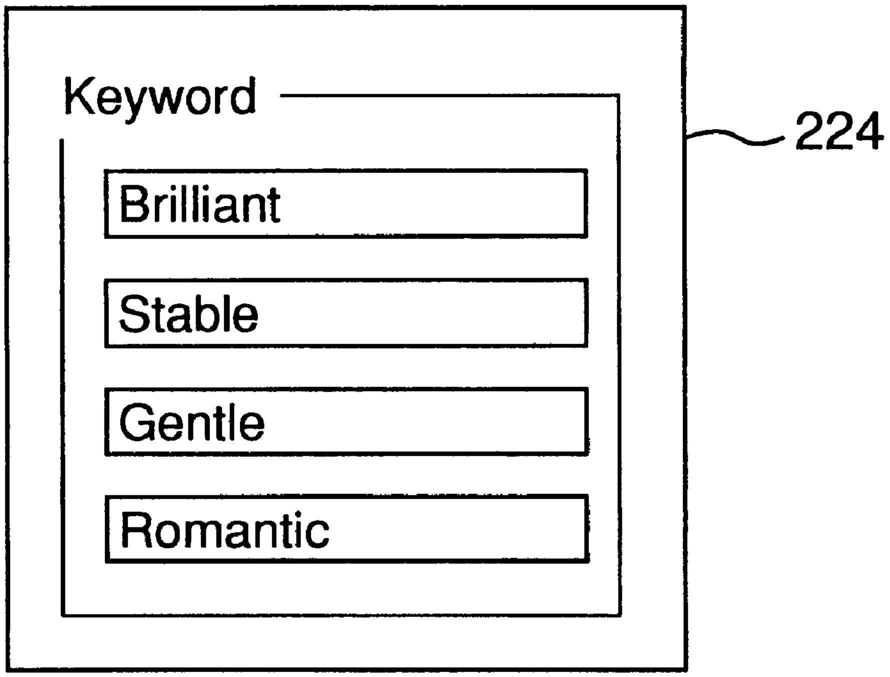
FIG. 21 is a diagram of the keyword display list when the keyword "romantic" is added by drag and drop.

FIG. 21 shows a keyword list after two keywords "gentle" and "romantic" are newly appended to the image data to which three keywords of "brilliant", "stable" and "gentle" have been added. In this example, because the number of keywords which can be added to one image data is four, two keywords cannot be added to the image data to which three keywords have already been added. However, the keyword of "gentle" is not counted as an appended keyword because it is the same keyword which has already been added to the image data. As a result, one keyword of "romantic" is decided to be able to be appended to the image data (YES at step S13283 in FIG. 20), and the keyword is appended.

Because the same keyword (retrieve key) can be added to a plurality of image data at the same time, the load to add keywords of a user is greatly reduced in this embodiment as explained above.

Moreover, because information on the keywords which have already been added to the image data is displayed in the display device 2 in this system when a plurality of image data are selected to which common keywords are added, a user can confirm the number of keywords which can be newly appended in one glance.

In this embodiment, a keyword is used as a retrieve key. However, other attribute information such as a color or a form which represents a characteristic of the image may also be used as a retrieve key.

In addition, though this embodiment is explained on a database management system, the invention can be applied widely to an apparatus or a program which adds attribute information to electronic information (objects) and controls them therewith.

As explained above, in the information processor of this embodiment, because the same attribute information can be added to two or more objects at the same time, the load of adding attribute information is greatly reduced.

Third Embodiment

Next, an information processor of a third embodiment of the invention is explained. The information processor also has a database management system for image data using a graphical user interface, and it consists of the components shown in FIG. 1. A controller which controls the information processor has a structure similar to that as shown in FIG. 2. However, the ROM 103 stores a program for executing the database management system of the third embodiment including processing on attribute information with dictionaries explained below. In this system, keywords which represent characteristics of an object are used as retrieve keys and they are added to objects or image data. However, colors, forms and the like which represent characteristic of an object can also be used. The hard disk drive 6 stores and manages a main dictionary storing all the keywords, sub-dictionaries storing a part of the keywords in the main dictionary, a keyword table, image data and attribute information thereof.

In this system, image data are objects to be dealt with. However, similarly to the first and second embodiments, an object to be managed in this system may be still image data, moving picture data, character data, audio data or multimedia data as a combination thereof. In addition, a folder which contains these data together can also be dealt as an object, or when a network is constructed, each computer itself can be dealt as an object.

This system has a function to provide a sub-dictionary which collects keywords selected from a main dictionary in which many keywords are registered as retrieve keys. By using this sub-dictionary, keywords desired by a user can be selected from a smaller number of specified keywords than those registered in the main dictionary.

Moreover, this system has a function of entire selection to select all the keywords registered in the sub-dictionary at the same time. In this system, a link relation is set between keywords registered in the main dictionary and those registered in a sub-dictionary. That is, the keywords registered in a sub-dictionary are not the keywords themselves, but data to identify the keywords registered in the main dictionary. That is, the keywords registered in the sub-dictionary have no substance. Therefore, even if a keyword registered in the sub-dictionary is deleted, the corresponding keyword registered in the main dictionary is not deleted, while if a keyword registered in the main dictionary is deleted, the keyword is also deleted from the sub-dictionary.

Figure 22:
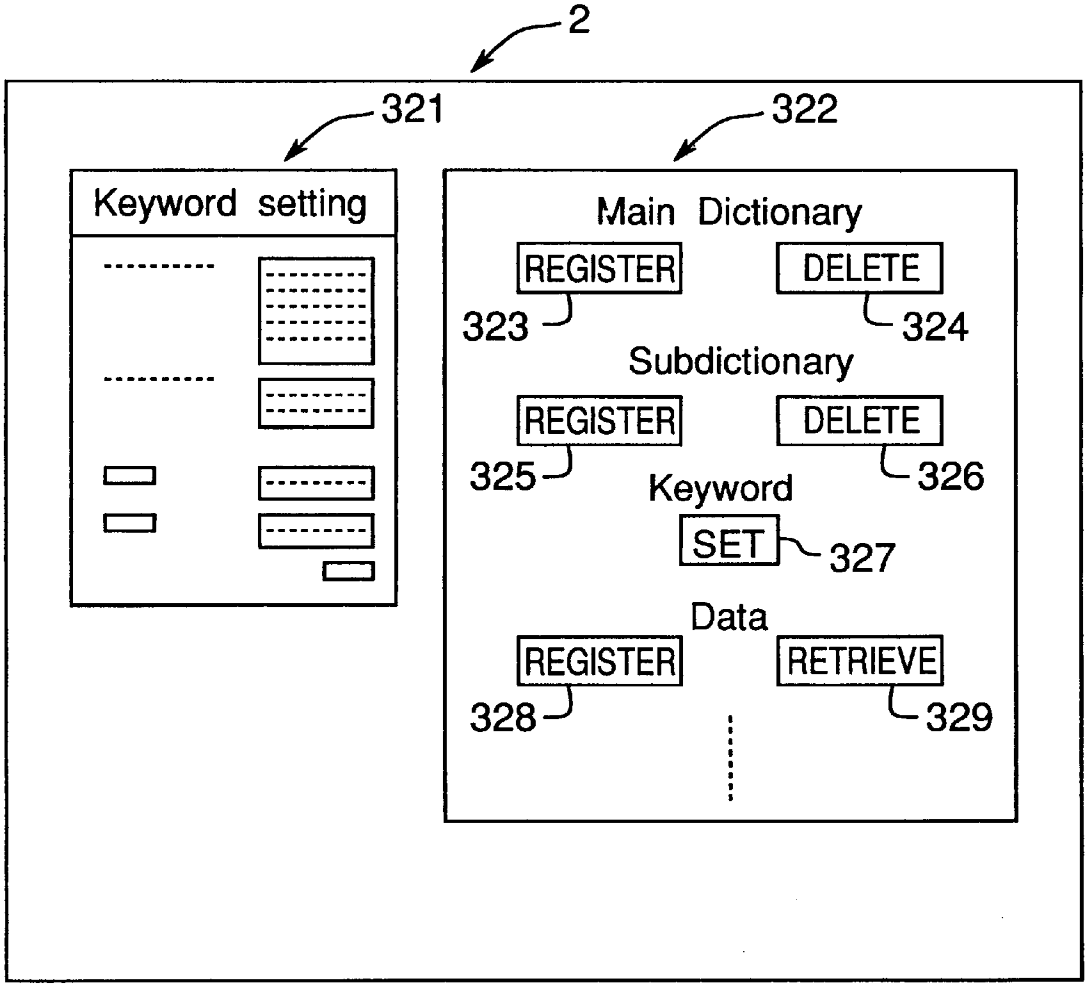
FIG. 22 is a diagram of a screen in a third embodiment.

Next, the processing executed by the CPU 101 is explained for realizing the above-mentioned functions. FIG. 22 shows a screen displayed in the display device 2 . Two windows 321 and 322 are displayed in the screen. The window 321 is a keyword setting screen as a dialogue box, and it is explained later in detail The window 322 shows a menu screen for selecting or instructing a processing. As to the main dictionary, menu items of "register" 323 and "delete" 324 are displayed to register a keyword to the main dictionary and to delete a keyword therefrom. As to the sub-dictionary, menu items of "register" 325 and "delete" 326 are displayed to register a keyword to the sub-dictionary and to delete a keyword therefrom. A menu item of "set" 327 is provided to set the keyword used for the data retrieve. In addition, for data retrieve, menu items of "register" 328 and "retrieve" 329 are displayed to add a keyword set in the keyword setting screen to a new image data and to retrieve the data with the, keyword set in the keyword setting screen. Though not shown explicitly in the menu screen, menus for preparing a new sub-dictionary and for changing the name of a sub-dictionary are also displayed.

Figure 23:
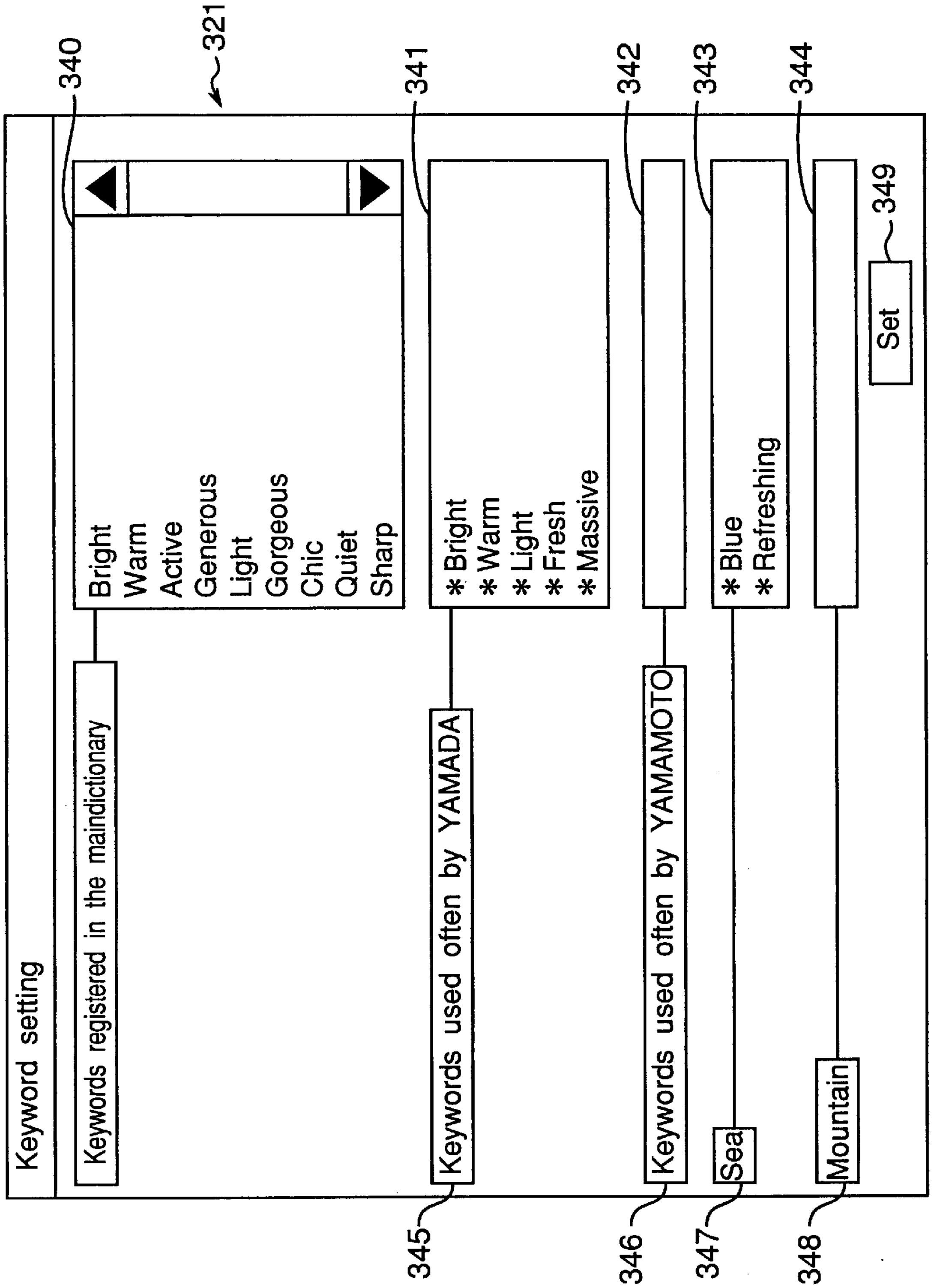
FIG. 23 is a diagram of a keyword setting screen.

FIG. 23 shows the keyword setting screen displayed in the window 321. As shown in FIG. 23, keyword list boxes 340–344 including the keywords registered in each dictionary are provided in the keyword setting screen. The mouse 4 can select a keyword in a list box. Moreover, the mouse 4 can select two or more keywords at the same time by clicking those keywords while pushing a specified key in the keyboard 3. A scroll bar is provided as shown in the list box 340 when the number of keywords to be displayed is larger than the number of keywords which can be displayed in the list box at the same time, and the keywords are scrolled in the list box. All the keywords registered in the main dictionary are displayed in the keyword list box 340.

The keywords registered in a sub-dictionary of dictionary named "keywords used often by Yamada," (button 340) are displayed in a keyword list box 341. A symbol "*" is added to the top of a keyword which is registered in the main dictionary in order to indicate a link relation to the keywords in the main dictionary. Similarly, keywords registered in each sub-dictionaries of dictionary name "keywords used often by Yamamoto" (button 346), "sea" (button 347) and "mountain" (button 348) are displayed in the keyword list boxes 342–344. For example, keywords which a user Yamada uses often are registered in the sub-dictionary of dictionary name "keywords used often by Yamada". Keywords which reminds of sea are registered in the sub-dictionary of dictionary name "sea". In the example shown in FIG. 23, nothing is displayed in the keyword list box 342 and 344 because no keywords are set in the sub-dictionaries of dictionary name "keywords used often by Yamamoto" and "mountain" It is also possible not to show the keyword boxes including no keyword. The buttons 345–348 with the names of the sub-dictionaries are displayed in the screen for the selection with the mouse 4. When one of the buttons is selected by the mouse 4, all the keywords registered in the selected sub-dictionary are selected. A button 349 of "set" is provided to set a keyword selected by the mouse 4 as a keyword for data retrieve or the like. A keyword registered in the main dictionary is registered to a sub-dictionary after the mouse 4 selects a keyword displayed in the keyword list box 340 and clicks either of the buttons 345–348 of the names of the sub-dictionaries. It is also possible to drag the selected keyword and drop it in a keyword list box of a sub-dictionary to be registered with the mouse 4.

Figure 24:
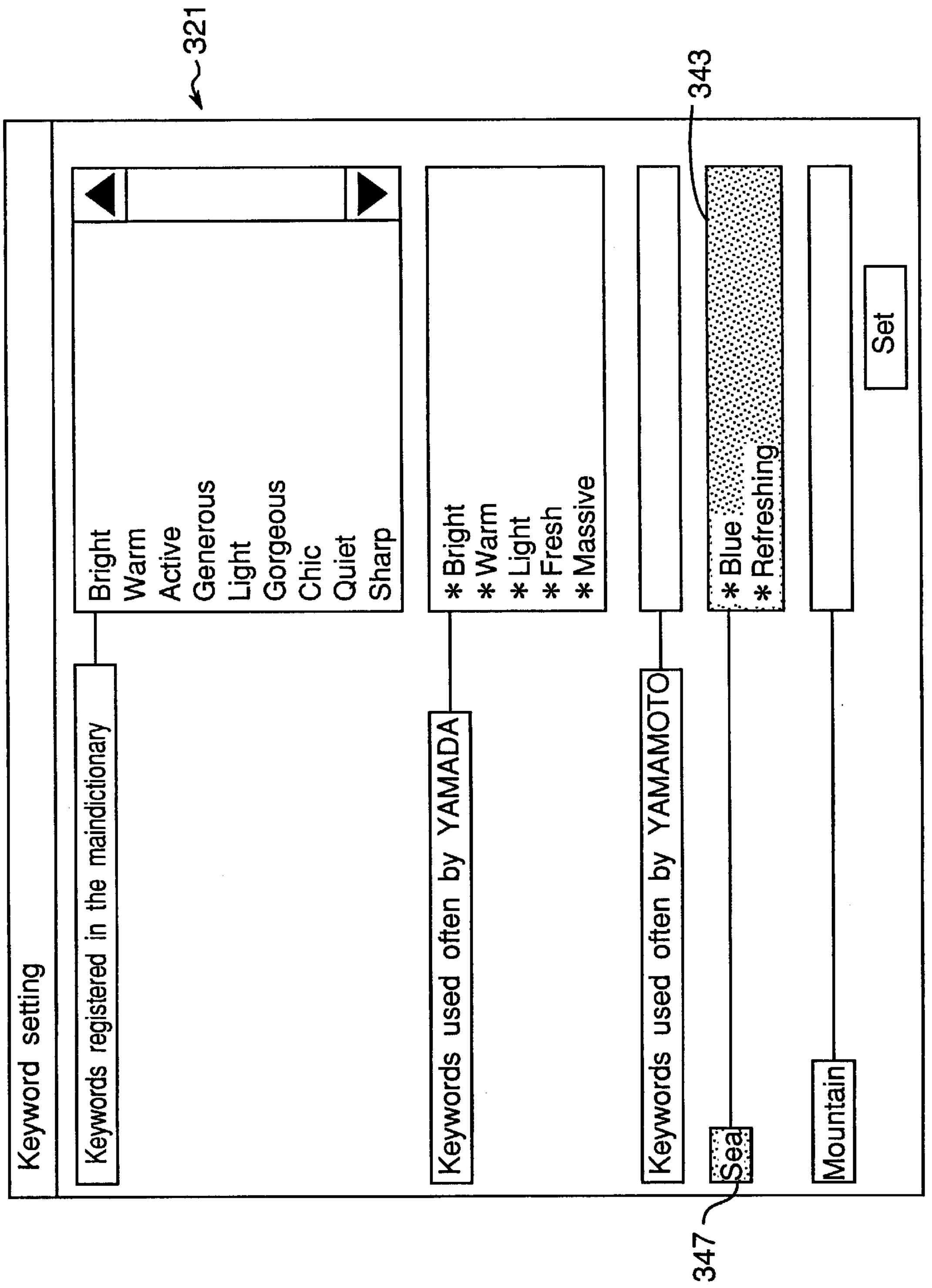
FIG. 24 is a diagram of a state of a keyword setting screen when a button of a sub-dictionary is selected.

FIG. 24 shows a state of the keyword setting screen when the button 347 of the sub-dictionary of dictionary name "sea" is selected by the mouse 4. When the button 347 is selected, all the keywords of "blue" and "refreshing" in the list box 343 are selected at the same time. In this example, the selected button and keywords are displayed with shade.

Figure 25:
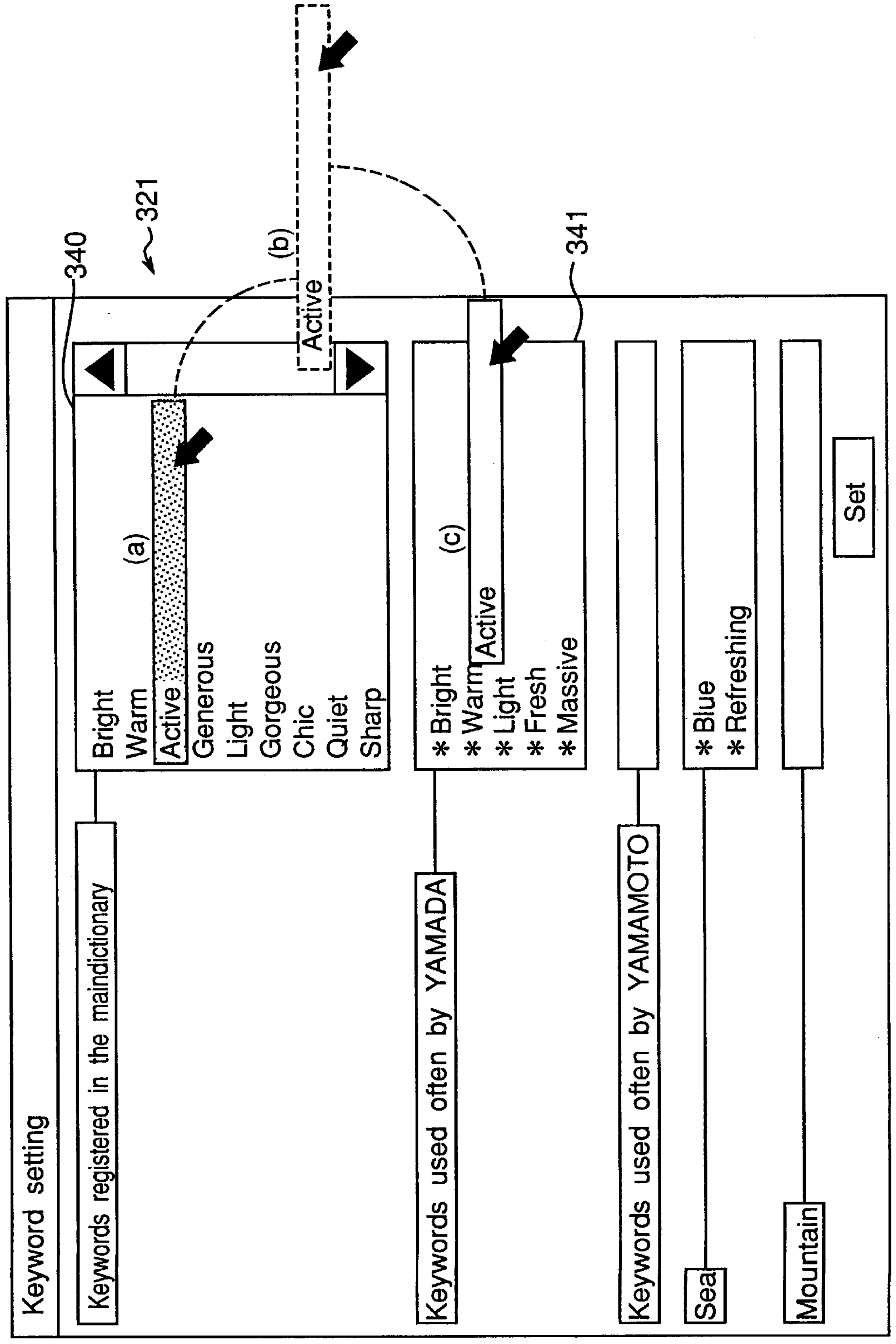
FIG. 25 is a diagram of a state of the keyword setting screen for explaining registration of a keyword with drag and drop.
Figure 26:
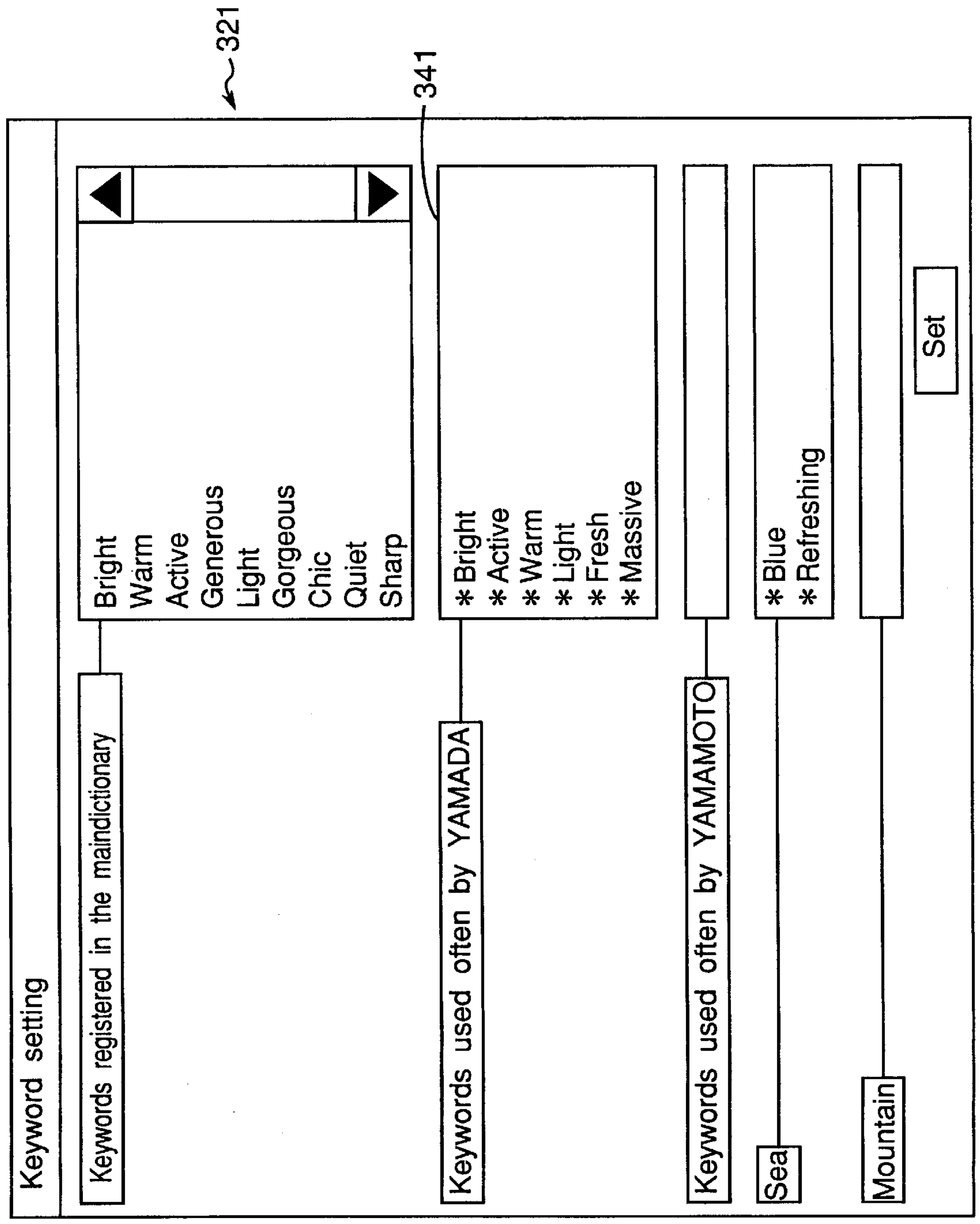
FIG. 26 is a diagram of a state of the keyword setting screen after the keyword is registered.

FIG. 25 illustrates registration of keyword "active" registered in the main dictionary to the sub-dictionary of dictionary name "keywords used often by Yamada" with drag and drop. First, the mouse 4 selects the keyword "active" in the keyword list box 340 as shown with shade (a). The keyword selected is dragged to the keyword list box 341 as shown with a hatched line (b). Then, as shown with a symbol (c), the keyword is dropped in the keyword list box 341. As a result, the keyword "active" is registered in the sub-dictionary of dictionary name "keywords used often by Yamada". Then, as shown in FIG. 26, the keyword setting screen displays the keyword "active" registered in the sub-dictionary of dictionary name "keywords used often by Yamada" in the list box 341.

FIG. 27 shows an example of a keyword table of the main dictionary to which keywords are registered. A data of each keyword is registered with association with an index number. For example, the keyword "bright" is associated with index number 0001. When the keyword in the main dictionary selected by the mouse 4 is registered to a sub-dictionary, the index number corresponding to the selected keyword is registered in the sub-dictionary.

FIG. 28 shows an example of a keyword table registered in the sub-dictionaries. Each sub-dictionary registers index numbers of the keywords associated with the keyword table of the main dictionary. The keywords corresponding to the index number registered in the sub-dictionaries are displayed in the keyword list boxes 341–344 with reference to the main dictionary.

Figure 29:
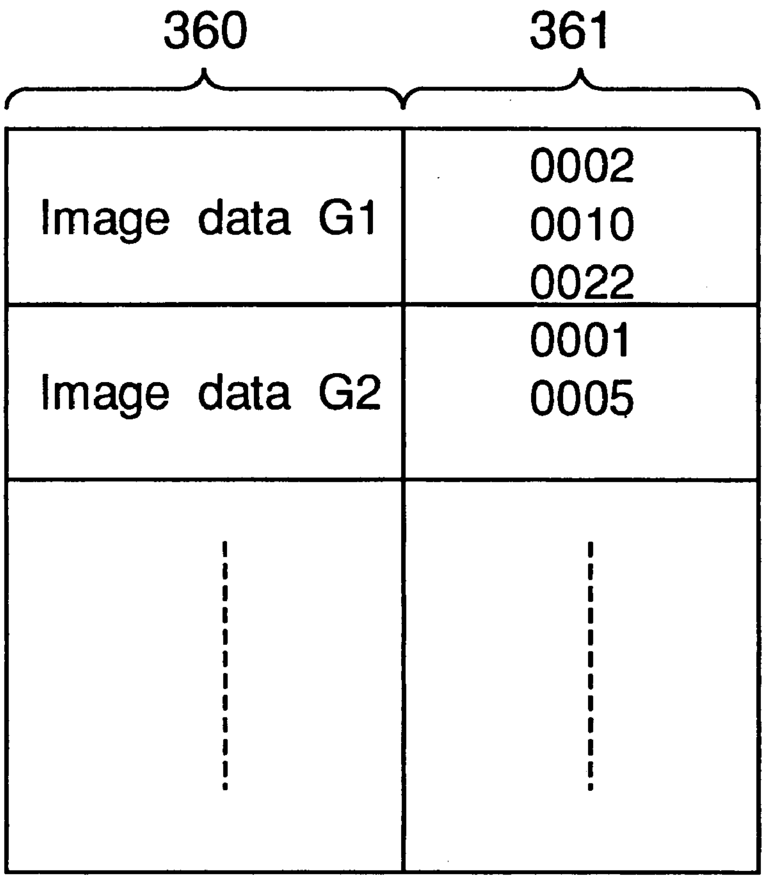
FIG. 29 is a diagram of a data structure in the hard disk drive.

FIG. 29 shows a data structure in the hard disk drive 6 schematically. Two areas 360 and 361 are provided in the hard disk drive 6. The area 360 stores registered image data G1, G2, . . . , and the area 361 stores index numbers 0002, 0010, 0022; 0001, 0005; . . . corresponding to the keyword added to the image data. When a keyword is added to the image data, the index number of the added keyword is written to the area 361 corresponding to the image data.

Figure 30:
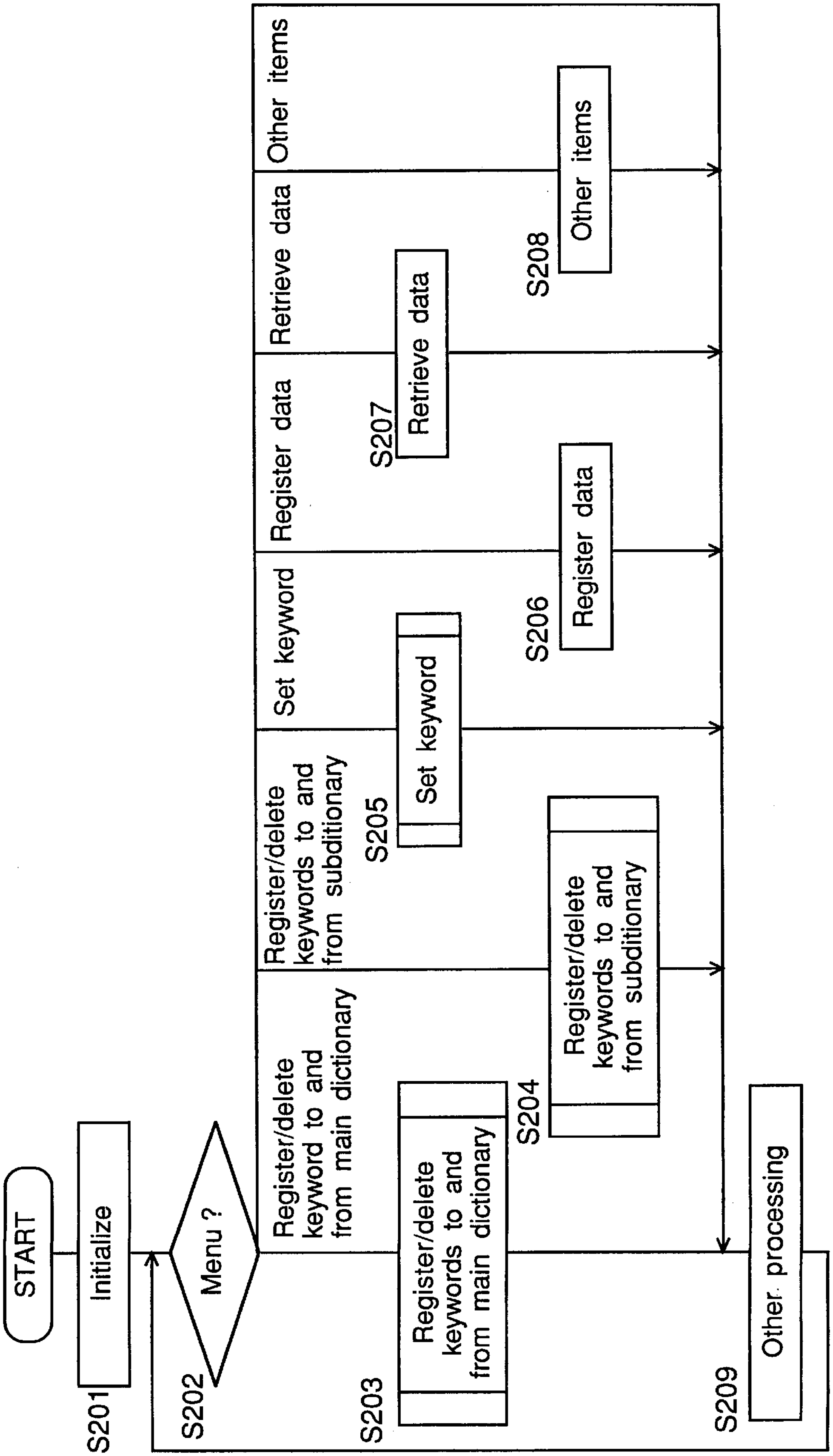
FIG. 30 is a flowchart of a main routine of the controller.

FIG. 30 is a flowchart of a main routine of the control processing performed by the CPU 101. When the program stored in the ROM 103 is started, variables necessary for the processing are initialized and the window 322 as a menu selection screen is displayed as an initial screen in the display device 2 (step S201). Both windows 321 and 322 may be displayed from the beginning in the initial screen. Next, it is decided whether a menu in the window 322 is selected (step S202). Here, when menu 323 of "register" or menu 324 of "delete" on the main dictionary is selected, register/delete processing of the keyword to and from the main dictionary is executed (step S203). When menu 325 of "register" or menu 326 of "delete" is selected on sub-dictionaries, register/delete of keyword to and from the sub-dictionary is executed (step S204). When menu 327 of "set" is selected on keywords, the set keyword processing is performed for setting keywords for data register or data retrieve (step S205). When the menu 328 of "register" on data is selected, the data register processing is performed for adding keywords set in the set keyword processing to the image data (step S206). Moreover, when menu 329 of "retrieve" on data is selected, the data retrieve processing is performed to retrieve an image data to which the keyword set by the keyword set processing is added in the image database composed of a large amount of image data stored in the hard disk drive 6 (step S207). When other menu items are selected, other items processings such as creation of a new sub-dictionary are executed (step S208). When the menu is not selected, other processings are executed readily (step S209). The data register processing (step S206), the data retrieve processing (step S207), other items processings (step S208), and other processings (step S209) are basically similar to the counterparts in a prior art information processor and not relate directly to the present invention, and detailed explanation thereof is omitted.

Figure 31:
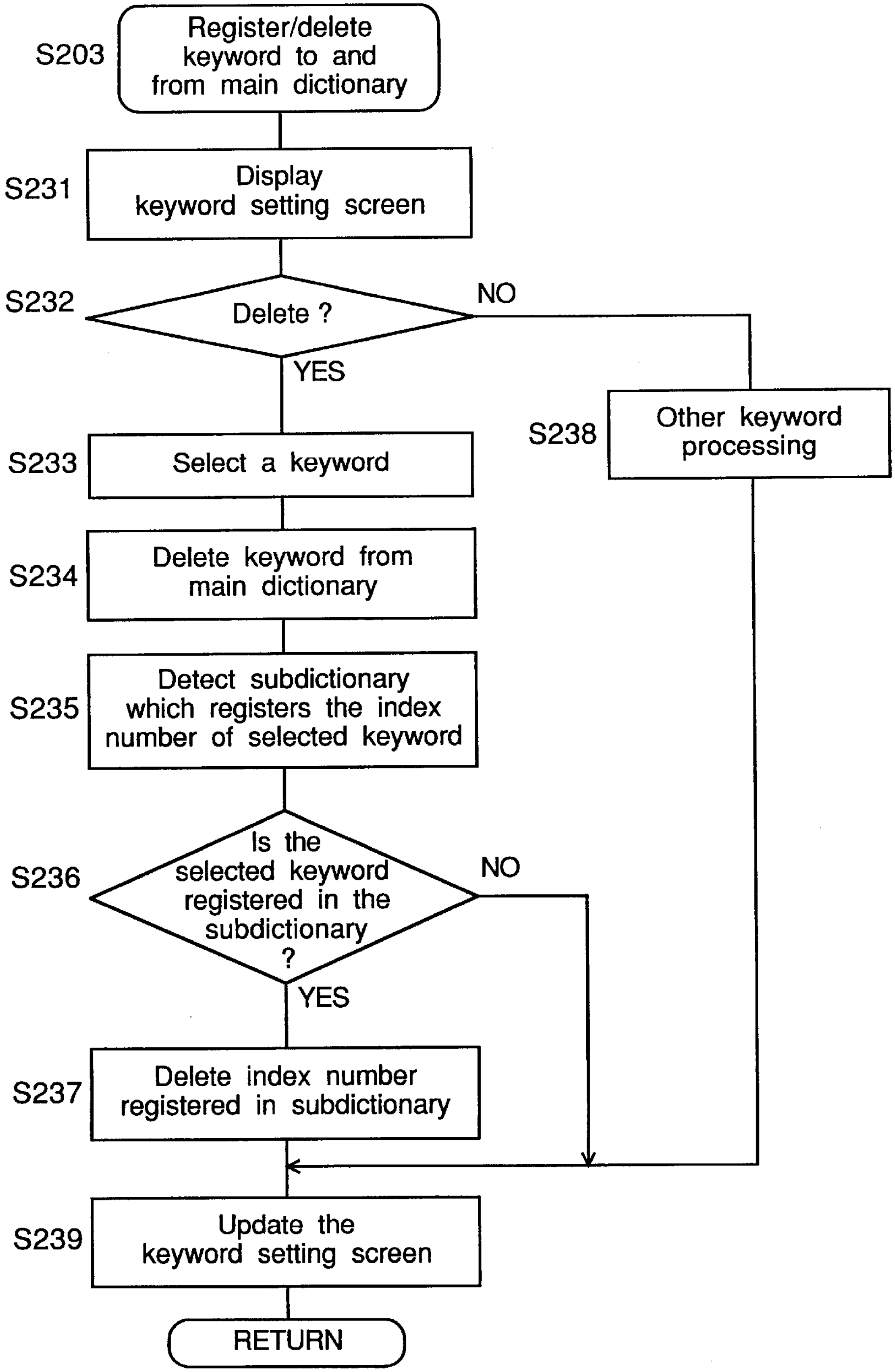
FIG. 31 is a flowchart of register/delete processing of keywords for a main dictionary.

FIG. 31 is a flowchart of register/delete processing (step S203 in FIG. 30), where keywords are added to or deleted from the main dictionary. In this flow, when a keyword is deleted, the keyword is also deleted from the sub-dictionary to which the deleted keyword is registered. First, the windows 321 and 322 shown in FIGS. 22 and 23 are displayed (step S231). When menu 324 of "delete" is selected (YES at step S232), a keyword to be deleted is selected in the keywords of the main dictionary in the keyword list box 340 (step S233), and the selected keyword and the index number thereof are deleted from the main dictionary (step S234). Next, a sub-dictionary which registers the index number of the selected keyword is detected (step S235). If the sub-dictionary which registers the index number is detected (YES at step S236), the index number is deleted from the sub-dictionary (step S237).

On the other hand, when menu 324 of "delete" is not selected (NO at step S232), or when menu 323 of "register" is selected, other keyword processing such as registration of the new keyword is performed (step S238). After the processing of step S237 or S238, the keyword setting screen is updated (step S239), and the flow returns to the main routine.

Figure 32:
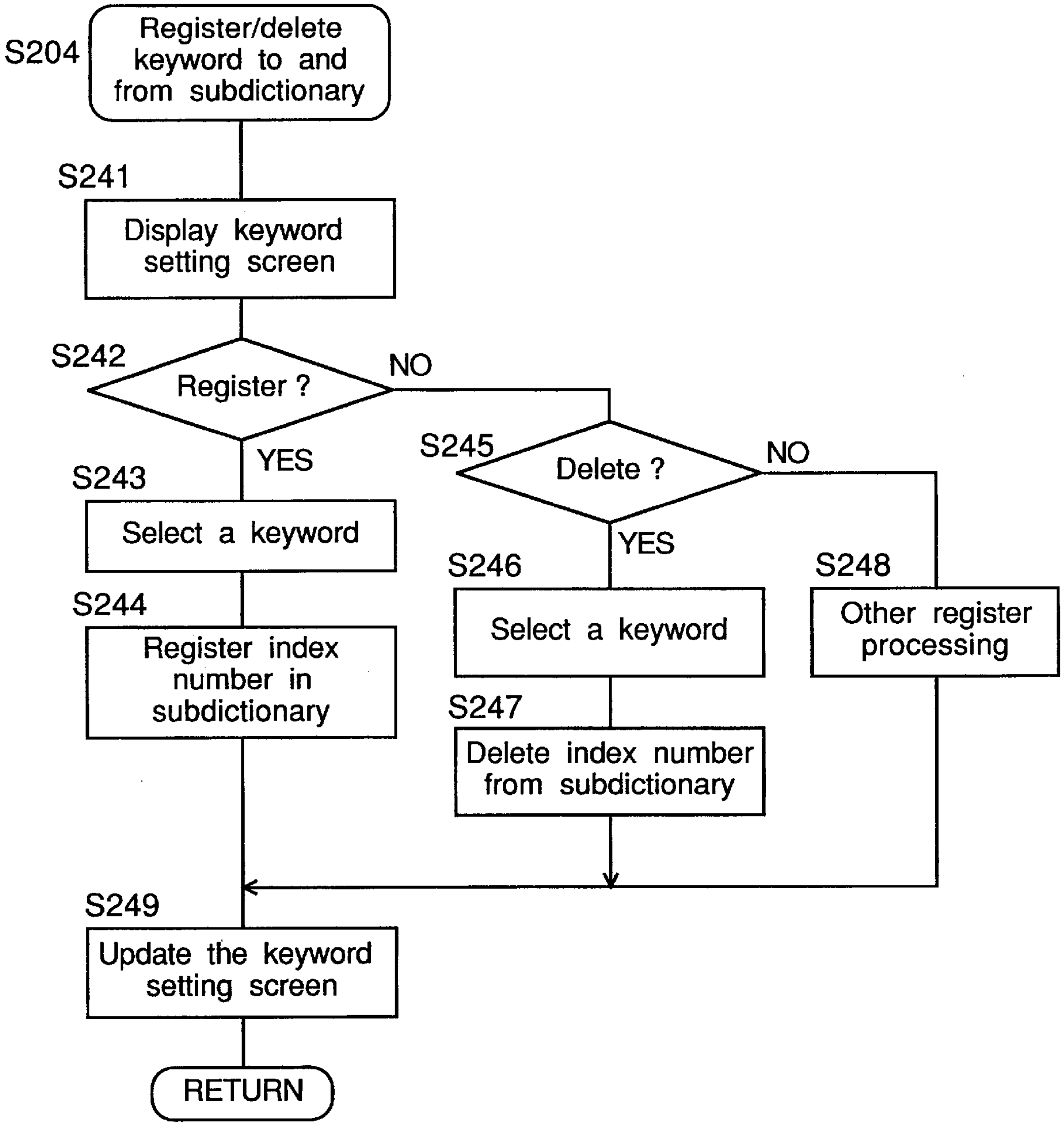
FIG. 32 is a flowchart of register/delete processing of keywords to a sub-dictionary.

FIG. 32 is a flowchart of register/delete processing (step S204 in FIG. 30), where keywords are added to or deleted from the sub-dictionaries. The keyword is deleted only in the sub-dictionaries to which the selected keyword is registered. First, the windows 321 and 322 shown in FIGS. 22 and 23 are displayed (step S241). When menu 325 of "register" is selected (YES at step S242), a keyword to be registered is selected in the keywords of the main dictionary in the keyword list box 340 (step S243), and the index number thereof is registered to a sub-dictionary by clicking a button of the sub-dictionary to which the keyword is registered or by performing drag and drop of the selected keyword to the keyword list box of the sub-dictionary (step S244). Thus, a link relation is formed by registering the same index number in the main dictionary. On the other hand, when menu 326 of "deletes" is selected (YES at step, S245), a keyword to be deleted is selected in the keywords of the sub-dictionaries in the keyword list box 341–344 (step S246), and the index number thereof is deleted from the sub-dictionary (step S247). When other menus are selected (NO at step S245), other register processing such as change of sub-dictionary name is performed (step S248). After the processing of step S244, S247 or S248, the keyword setting screen is updated (step S249), and the flow returns to the main routine.

Figure 33:
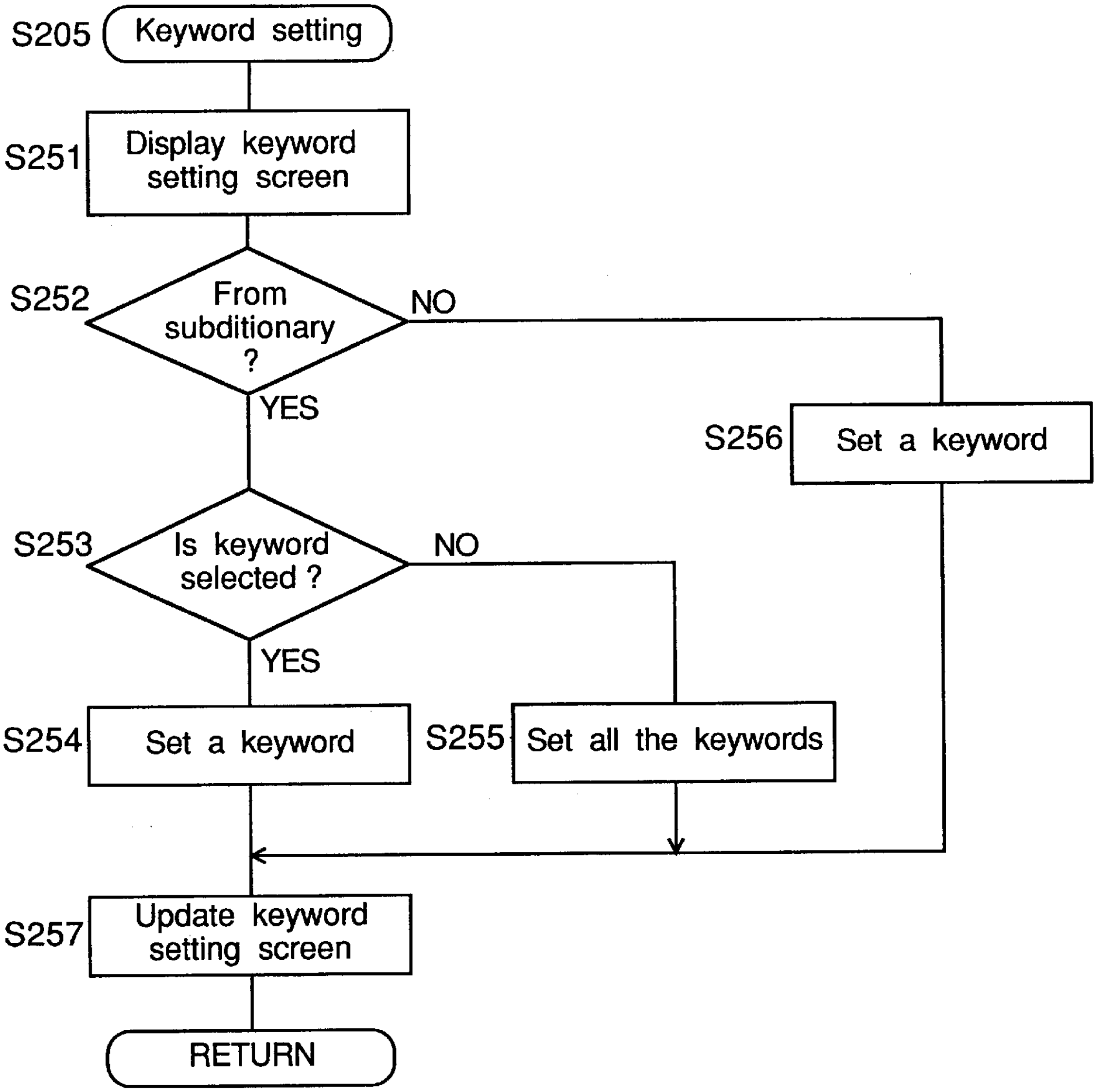
FIG. 33 is a flowchart of keyword setting processing.

FIG. 33 is a flowchart of the set keyword processing (step S205 in FIG. 30), wherein a keyword for adding the keyword to the image data or for retrieving a desired image data in the image database is set and stored in the RAM 104. First, the keyword setting screen is displayed to make it possible to select a keyword in the keyword list boxes 340–344 or buttons 345–348 of the sub-dictionaries (step S251). When a keyword in the keyword list boxes 341–344 of the sub-dictionaries is selected and the button 349 of "set" is clicked (YES at step S252, YES at step S253), the selected keywords are set as keywords to be used (step S254). When one of buttons 345–348 of the sub-dictionaries is selected and the button 349 of "set" is clicked (YES at step S252, NO at step S253), all the keywords for the selected sub-dictionary are set as keywords to be used (step S255). When a keyword in the keyword list box 340 of the main dictionary is selected and the button 349 of "set" is clicked (NO at step S252), the selected keyword is set as a keyword to be used (step S256). After the processing of step S254, S255 or S256, the keyword setting screen is updated (step S257), and the flow returns to the main routine.

In this embodiment, only keywords are used as retrieve keys. However, colors and forms which represent characteristics of an image can also be used as retrieve keys besides the keywords. In this case, it is desirable to provide a plurality of main dictionaries in correspondence to the types of retrieve keys. A dictionary number as a discrimination number is assigned to each main dictionary. In each sub-dictionary, dictionary number of the main dictionary and index number are registered for each retrieve key.

Next, a modified embodiment using two main dictionaries is explained with reference to link structure. Keywords are registered as retrieve keys in the first main dictionary, while icons are registered as retrieve keys in the second main dictionary.

Figure 34:
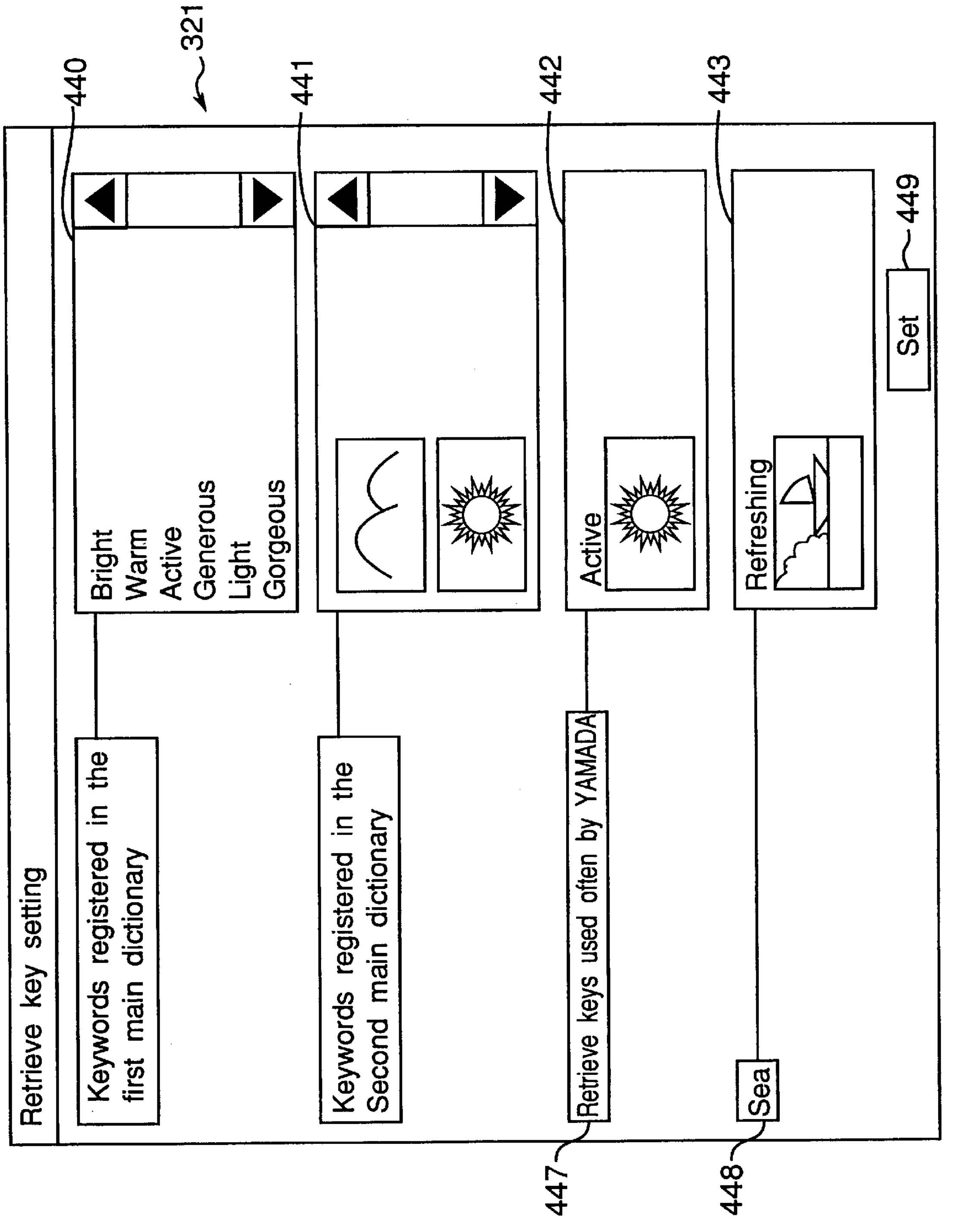
FIG. 34 is a diagram of an example of retrieve key setting screen in a modified embodiment.

FIG. 34 shows an example of a retrieve key setting screen displayed in the window 321 instead of the keyword setting screen shown in FIG. 23 when the first and the second main dictionaries are used. List boxes 440–443 are displayed in the retrieve key setting screen where the retrieve keys (keywords and icons) are registered for each dictionary. The list box 440 shows keywords registered in the first main dictionary, while the list box 441 shows icons registered in the second main dictionary. The list boxes 442 and 443 show keywords and icons registered in the sub-dictionaries of "retrieve keys used often by Yamada" and "sea". The buttons 447 and 448 displaying the registration names of the sub-dictionaries can be selected with the mouse 4. When one of the buttons 447 and 448 is selected, all the retrieve keys registered in the sub-dictionary of the selected button are selected. The button 449 of "set" is used for adding a keyword or an icon selected by the mouse 4 to the image data or for setting the keyword or the icon as retrieve key used for retrieving desired image data in the image database.

FIG. 35A shows a table of keywords of the first main dictionary similar to that shown in FIG. 27, while FIG. 35B shows a table of icons of the second main dictionary. The data of each icon is registered in correspondence to the index number. The first main dictionary has dictionary number of one, while the second one has dictionary number of two. When a keyword in the first main dictionary or an icon in the second main dictionary is registered in a sub-dictionary, the dictionary number and an index number of the keyword or icon are registered for the sub-dictionary.

FIG. 36 shows an example of a table of the sub-dictionaries. The dictionary number and the index number of retrieve key are registered for each sub-dictionary. The keywords and the icons corresponding to dictionary number and the index number registered in a sub-dictionary are displayed in the list box for each sub-dictionary in the retrieve key setting screen by referring to the first and second main dictionaries.

FIG. 37 shows an example of a data structure in the hard disk drive 6 schematically when the first and second main dictionaries are used. In a first area 465 for storing data, data on image data G1, G2 and the like are stored. In a, second area 466 for storing index number for keywords, index numbers of 0002, 0010 and 0022 for the first image data, 0001 and 0005 for the second image data and the like are stored. In a third area 467 for storing index number for icons, index numbers of 0011 and 0015 for the first image data, 0002 and 0003 for the second image data and the like are stored. When image data are retrieved, if a keyword is set as a retrieve key, the index number in the area 466 is retrieved, while if an icon is set as a retrieve key, the index number in the area 467 is retrieved.

Delete/register processing of a keyword or an icon A registered in the first and second main dictionaries to and from the sub-dictionaries is the same as the counterpart shown in FIG. 32 except that the dictionary number is deleted/registered besides the index number. The processing is similar if the number of main dictionaries is increased further. By using a plurality of main dictionaries, the easiness of operation is improved because the number of retrieve keys registered in each main dictionary decreases. Further, because a main dictionary is divided into different kinds of retrieve key, it is convenient when only a specified type of retrieve keys is used.

As explained above, in this embodiment, attribute information registered in the main dictionary is classified into sub-dictionaries. Therefore, even if the number of attribute information registered in the main dictionary is large, a desired attribute information can be selected easily by extracting attribute information in the main dictionary from the relevant sub-dictionary.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information processor which stores and manages objects with attribute information added to the objects, the information processor comprising:

a main dictionary in which attribute information and data for identifying the attribute information are registered;

a sub-dictionary in which data for identifying attribute information for a part of the attribute information registered in said main dictionary are registered;

a display means for displaying all the attribute information identified by the data registered in said subdictionary in a screen;

a selection means for selecting an attribute information displayed in the screen; and a means for extracting a substance of the attribute information selected by said selection means with reference to said main dictionary based on the data registered in said sub-dictionary.

2. The information processor according to claim 1, wherein said main dictionary comprises a plurality of dictionary sections classified by the type of attribute information, and data for identifying the type of the dictionary section are registered in said sub-dictionary besides the data for identifying the attribute information.

3. The information processor according to claim 1, wherein said selection means can select all the attribute information for the data registered in said sub-dictionary at the same time.

4. The information processor according to claim 1, further comprising a data management means for deleting the data for identifying attribute information registered in said sub-dictionary at the same time when the attribute information and the data for identifying the attribute information are deleted from said main dictionary.

5. A method for managing attribute information added to an object, the method comprising the steps of:

(a) providing a main dictionary in which attribute information and data for identifying the attribute information are registered;

(b) providing a sub-dictionary in which data for identifying attribute information for a part of the attribute information registered in said main dictionary are registered;

(c) displaying all the attribute information identified by the data registered in said sub-dictionary in a screen;

(d) selecting an attribute information displayed in the screen; and (f) extracting a substance of the attribute information selected at step (d) with reference to said main dictionary based on the data registered in said sub-dictionary.

6. The method according to claim 5, wherein said main dictionary comprises a plurality of dictionary sections classified by the type of attribute information, and data for identifying the type of the dictionary section are registered in said sub-dictionary besides the data for identifying the attribute information.

7. The method according to claim 5, wherein at step (d) all the attribute information for the data registered in said sub-dictionary can be selected at the same time.

8. The method according to claim 5, further comprising the step of deleting the data for identifying attribute information registered in said sub-dictionary at the same time when the attribute information and the data for identifying the attribute information are deleted from said main dictionary.

9. A computer program product stored in a recording medium executable by a computer for managing attribute information to be added to an object, said computer program product comprising:

a display means for displaying all the attribute information identified by data registered in a sub-dictionary in a screen, wherein the sub-dictionary registers data for identifying attribute information for a part of the attribute information registered in a main dictionary registering attribute information and data for identifying the attribute information;

a selection means for selecting an attribute information displayed in the screen; and a means for extracting a substance of the attribute information selected by said selection means with reference to said main dictionary based on the data registered in said sub-dictionary.

10. The computer program product according to claim 9, wherein said selection means can select all the attribute information for the data registered in the sub-dictionary at the same time.

11. The computer program product according to claim 9, further comprising a data management means for deleting the data for identifying attribute information registered in the sub-dictionary at the same time when the attribute information and the data for identifying the attribute information are deleted from the main dictionary.

* * * * *